(12) United States Patent
Nomura et al.

(10) Patent No.: US 6,424,807 B2
(45) Date of Patent: Jul. 23, 2002

(54) ZOOM LENS ASSEMBLING MECHANISM

(75) Inventors: Hiroshi Nomura, Saitama; Nobuaki Aoki, Tokyo; Yoshihiro Yamazaki, Saitama; Satoru Nakamura, Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 09/774,671

(22) Filed: Feb. 1, 2001

(30) Foreign Application Priority Data

Feb. 3, 2000 (JP) .......................................... 2000-026705

(51) Int. Cl.[7] .......................... G03B 17/00; G02B 15/14
(52) U.S. Cl. ............................. 396/72; 396/74; 359/699
(58) Field of Search ............................. 396/72, 73, 74, 396/75; 359/699, 700, 701, 703, 695, 704

(56) References Cited

U.S. PATENT DOCUMENTS

| 5,313,329 A | 5/1994 | Ueda |
| 5,589,987 A | 12/1996 | Tanaka |
| 5,812,889 A | 9/1998 | Nomura et al. |
| 6,014,269 A | 1/2000 | Nomura et al. |

*Primary Examiner*—Russell Adams
*Assistant Examiner*—Arthur A Smith
(74) *Attorney, Agent, or Firm*—Greenblum & Bernstein, P.L.C.

(57) ABSTRACT

A zoom lens assembling mechanism includes a stationary barrel; a movable barrel; a linear guide barrel; a linear guide mechanism for linearly guiding the linear guide barrel; and at least one lens group which is linearly guided by the linear guide barrel. When the movable barrel is in an operating range, the linear guide barrel is linearly guided via the linear guide mechanism, while the movable barrel moves with the linear guide barrel while relatively rotating, to move the lens group. If the movable barrel is moved forward from a frontmost position of the operating range in order to disassemble an assembly including the movable barrel and the linear guide barrel from the stationary barrel, the linear guide barrel is no longer guided by the linear guide mechanism, and the linear guide barrel moves forward while rotating with the movable barrel to thereby remove the assembly.

20 Claims, 24 Drawing Sheets

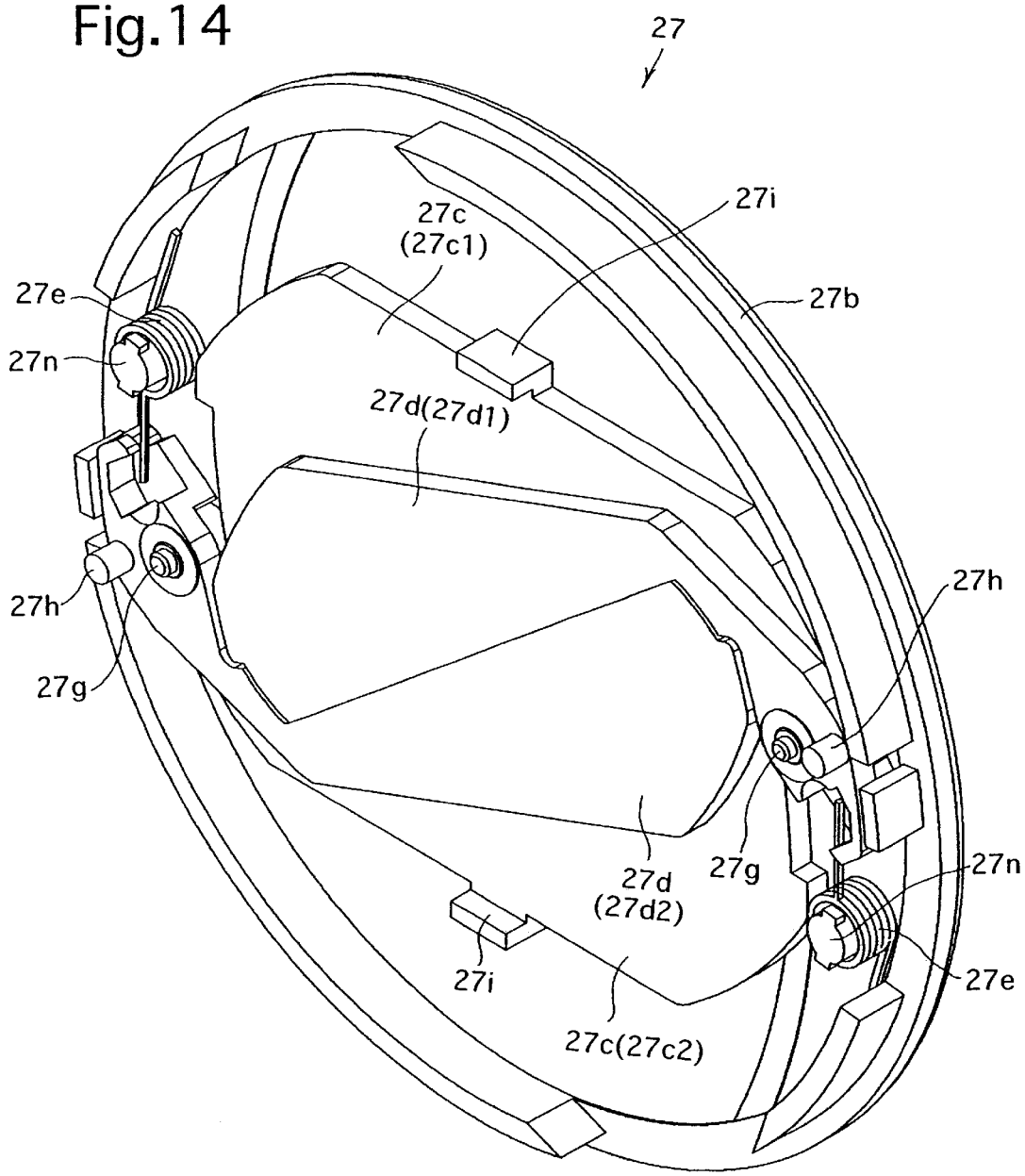

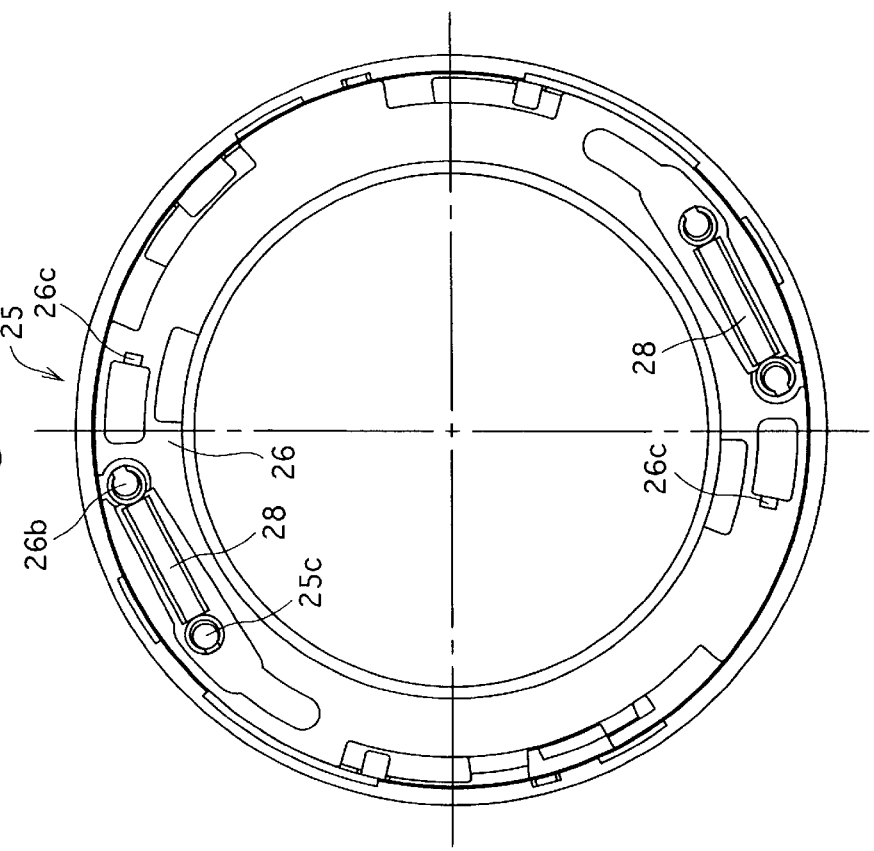
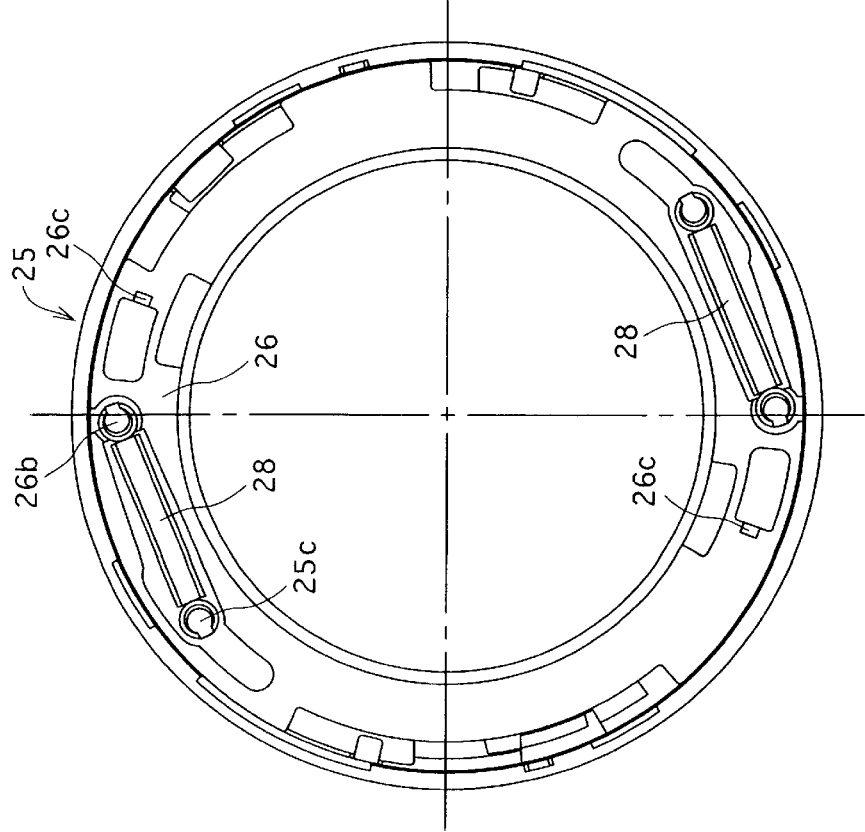

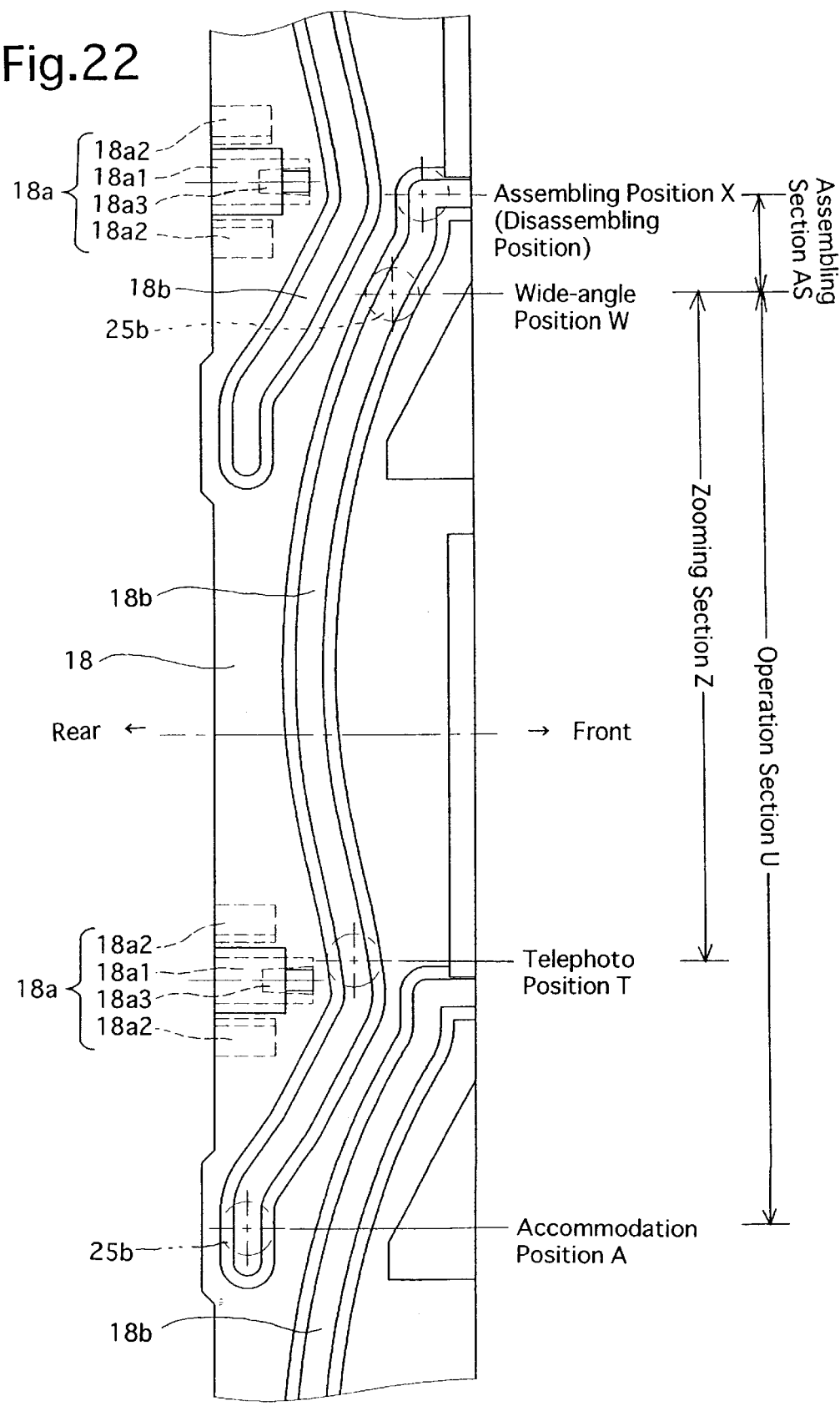

ZOOM LENS ASSEMBLING MECHANISM

BACKGROUND OF THE INVENTION

1. Field of the Invention

The present invention relates to a zoom lens, or a zoom lens barrel, that can be used in digital cameras, and more specifically, to a zoom lens assembling mechanism which makes it easy for the zoom lens to be assembled and disassembled.

2. Description of the Related Art

A zoom lens, or a zoom lens barrel, having a movable barrel (e.g., a cam barrel) that is supported to be movable in the direction of the optical axis of the zoom lens while rotating about the optical axis relative to a stationary barrel of the zoom lens is known in the art. Such a zoom lens having a mechanism with which the movable barrel can be dismounted from the stationary barrel by rotating the movable barrel up to a position (disassembling position) toward the front of the operating range of the movable barrel, which includes the zooming range of the movable barrel, is also known in the art. The opposite ends of the zooming range of the movable barrel correspond to the wide-angle position and the telephoto position of the movable barrel, respectively. In a zoom lens having such a mechanism, the amount of overlap between the movable barrel and the stationary barrel in the optical axis direction (i.e., the length of supporting part of the stationary barrel for the movable barrel) becomes smaller as the movable barrel moves toward the front of the operating range thereof. Therefore, when the movable barrel is moved to the maximum extended position in the operating range thereof, the strength between the movable barrel and the stationary barrel for supporting the movable barrel by the stationary barrel is low, so that there is a possibility of the movable barrel being eccentric and/or tilting with respect to the optical axis, and/or deviating in the optical axis direction. For instance, in the case where the movable barrel and the stationary barrel are engaged with each other via male and female helicoids (helicoidal threads) respectively formed on the movable barrel and the stationary barrel, a sufficient amount of engagement between the male and female helicoids cannot be ensured when the movable barrel is moved to the maximum extended position in the operating range thereof, which reduces the strength between the movable barrel and the stationary barrel for supporting the movable barrel by the stationary barrel. If the movable barrel is eccentric and/or tilts with respect to the optical axis, and/or deviates in the optical axis direction, the lens group or groups which are supported inside the movable barrel cannot stay at their right positions, which deteriorates the optical performance of the zoom lens.

Upon assembly, every lens element of a digital camera must be optically centered, correctly spaced, and held firmly with a relatively high precision, e.g., tens times greater than that required in conventional cameras using light-sensitive film since object images are formed on the sensitive surface of a small CCD (CCD image sensor) which is much smaller than the picture plane of conventional cameras using light sensitive film. For instance, if the angle of view is constant, the focal length of a photographing lens becomes shorter as the size of the picture plane reduces, which in turn reduces the sizes of all the elements of the photographing lens such as lens elements, lens frames and other elements. Therefore, the influence that a tolerance (e.g., 10 $\mu$m) has on a photographing lens system of a digital camera is much larger than the influence that the same tolerance would have on a photographing lens system of a conventional camera using light-sensitive film. Accordingly, manufacturing error which falls within tolerance of optical performance in the photographing optical system of a conventional camera using light-sensitive film can be outside the tolerance of optical performance in the photographing optical system of a digital camera.

To prevent such a deterioration of the optical performance from occurring, it is possible to increase the amount of overlap between the movable barrel and the stationary barrel in the optical axis direction (increasing the amount of engagement of male and female helicoids if the movable barrel and the stationary barrel are engaged with each other via male and female helicoids) when the movable barrel is in the maximum extended position in the operating range thereof to ensure a sufficient strength between the movable barrel and the stationary barrel for supporting the movable barrel by the stationary barrel. However, in this structure, the amount of rotational movement of the movable barrel from the frontmost position in the operating range to the disassembling position is great, which may impair the ease of assembly and disassembly of the zoom lens. In general, the movable barrel is coupled to a linear guide barrel to be rotatable about the optical axis relative to the linear guide barrel and to be movable in the optical axis direction together with the linear barrel, while the linear guide barrel is guided in the optical axis direction without rotating about the optical axis via linear guide grooves formed on the stationary barrel. Frictional resistance is generated between the linear guide barrel and the movable barrel when a driving force given to the movable barrel to rotate the same is converted into another driving force for moving the linear guide barrel linearly. Due to this fact, if the amount of rotational movement of the movable barrel from the frontmost position in the operating range to the disassembling position is great, the frictional resistance continues to be generated between the linear guide barrel and the movable barrel while the movable barrel is being moved all the way to the disassembling position when the movable barrel is dismounted from the stationary barrel. This reduces efficiency of assembly and disassembly of the zoom lens. Furthermore, if the amount of rotational movement of the movable barrel from the frontmost position in the operating range to the disassembling position is great, the movable barrel has to be rotated relative to the linear guide barrel to some degree in a range outside of the zooming range, which unnecessarily moves the lens group or groups supported within the linear guide barrel and the movable barrel. This is not preferable from the viewpoint of maintenance of the optical performance of the zoom lens and simplification of the lens group guiding structure of the zoom lens.

If the amount of overlap between the movable barrel and the stationary barrel in the optical axis direction is small, in some cases a light shield structure has to be provided between the movable barrel and the stationary barrel, since unwanted light can possibly enter into the zoom lens from a gap between the movable barrel and the stationary barrel. Moreover, in the case where linear guide slots for guiding the linear guide barrel in the optical axis direction without rotating the linear guide barrel about the optical axis are formed on the stationary barrel to extend along the length thereof, unwanted light can easily enter into the zoom lens from the linear guide slots.

SUMMARY OF THE INVENTION

The present invention has been devised in view of the above-described problems, wherein an object of the present invention is to provide a zoom lens assembling mechanism with which the optical performance of the zoom lens can be maintained, which prevents unwanted light from entering into the zoom lens from a gap between two barrels of the zoom lens, and which makes it easy for the zoom lens to be assembled and disassembled.

To achieve the object mentioned above, according to an aspect of the present invention, a zoom lens assembling mechanism is provided, including a stationary barrel having a female helicoid formed on an inner peripheral surface of the stationary barrel; a linear guide groove formed on the inner peripheral surface of the stationary barrel to cut across the female helicoid to extend parallel to an optical axis of the zoom lens; an inner inclined groove formed on the inner peripheral surface of the stationary barrel in front of the linear guide groove in an optical axis direction so that a major part of the inner inclined groove extends parallel to the threads of the female helicoid, so that one end of the inner inclined groove opens at a front end of the stationary barrel, and so that the other end of the inner inclined groove is connected with the linear guide groove; a movable barrel having a male helicoid formed on an outer peripheral surface of the movable barrel to mesh with the female helicoid, the movable barrel being moved forward and rearward in the optical axis direction while rotating about the optical axis in accordance with an engagement of the male helicoid with the female helicoid; a linear guide barrel guided to be movable together with the movable barrel in the optical axis direction and to be rotatable relative to the movable barrel about the optical axis; a linear guide projection formed on the linear guide barrel to be engaged in the linear guide groove, so that the linear guide projection can also be engaged in the inner inclined groove; and at least one lens group guided in the optical axis direction without rotating about the optical axis by the linear guide barrel to be moved in the optical axis direction in a predetermined moving manner in accordance with rotation of the movable barrel to change a focal length of the zoom lens. The linear guide barrel is guided in the optical axis direction with the linear guide projection being engaged in the linear guide groove when the movable barrel is positioned in an operating range, including a zooming range of the movable barrel, relative to the stationary barrel. The male helicoid and the female helicoid are engaged with each other by an amount of engagement in the optical axis direction which corresponds to a width in the optical axis direction of an area on the inner peripheral surface of the stationary barrel in which the inner inclined groove is formed when the movable barrel is positioned in a frontmost position thereof in the operating range. If the movable barrel is moved forward from the frontmost position relative to the stationary barrel in order to disassemble an assembly including the movable barrel and the linear guide barrel from the stationary barrel, the linear guide barrel moves forward in the optical axis direction, and at the same time, rotates together with the movable barrel about the optical axis while the linear guide projection slides along the inner inclined groove to thereby disassemble the assembly from the stationary barrel.

Preferably, the zoom lens further includes a rotational barrel positioned around the movable barrel, the rotational barrel being rotationally driven; a rotation transmission groove formed on the outer peripheral surface of the movable barrel to cut across the male helicoid to extend parallel to the optical axis; an outer inclined groove formed on the outer peripheral surface of the movable barrel behind the rotation transmission groove in the optical axis direction so that a major part of the outer inclined groove extends parallel to the threads of the male helicoid, so that one end of the outer inclined groove opens at a rear end of the movable barrel, and so that the other end of the outer inclined groove is connected with the rotation transmission groove; and an inward projection formed on the rotational barrel to be engaged in the rotation transmission groove, so that the inward projection can also be engaged in the outer inclined groove. Rotation of the rotational barrel is transmitted to the movable barrel with the inward projection being engaged in the rotation transmission groove when the movable barrel is positioned in the operating range relative to the stationary barrel. If the movable barrel is moved forward from the frontmost position relative to the stationary barrel in order to disassemble the assembly from the stationary barrel, the linear guide barrel moves forward in the optical axis direction, and at the same time, rotates together with the movable barrel about the optical axis while the inward projection slides along the outer inclined groove to thereby disassemble the assembly from the stationary barrel.

Preferably, the zoom lens assembling mechanism further includes a cam groove formed on an inner peripheral surface of the movable barrel so that a rear end of the cam groove opens at a rear end of the movable barrel; a linear guide slot formed on the linear guide barrel to extend parallel to the optical axis so that a rear end of the linear guide slot opens at a rear end of the linear guide barrel; a lens frame which holds the lens group; a cam follower formed on the lens frame to be engaged in the cam groove; and a linear guide projection formed on the lens frame to be engaged in the linear guide slot. The cam follower and the linear guide projection are respectively engaged in the cam groove and the linear guide slot, at rear ends thereof, when the assembly is moved forward from the stationary barrel to disassemble the assembly from the stationary barrel.

Preferably, the cam follower is formed on the linear guide projection.

In an embodiment, the zoom lens further includes a hood barrel positioned at the front of the zoom lens around the movable barrel, guided in the optical axis direction without rotating about the optical axis; an inward pin fixed to the hood barrel to project radially inwards; and a hood barrel guide groove formed on an outer peripheral surface of the movable barrel, the inward pin being engaged in the hood barrel guide groove so that the hood barrel moves in the optical axis direction via rotation of the movable barrel. The hood barrel guide groove includes an assembling section and an operating section connected to the assembling section so as to extend substantially along a circumferential direction of the movable barrel, wherein one end of the assembling section opens at the front end of the movable barrel. The operating section includes a zooming section in which rotation of the movable barrel causes the hood barrel to move forward and rearward in the optical axis direction. The rotation of the movable barrel causes the hood barrel to move forward and rearward in the optical axis direction to change a distance between a frontmost lens group of the lens group and the front end of the hood barrel in the optical axis direction in accordance with a variation of the focal length. The hood barrel can be disassembled from the front of the zoom lens by moving the inward pin forward to pull out the inward pin from the hood barrel guide groove when the inward pin is positioned in the one end of the assembling section. The assembly can be dismounted from the stationary barrel by being moved slightly forward from the frontmost position of the movable barrel relative to the stationary barrel when the movable barrel is positioned to have a predetermined rotational position relative to the stationary barrel so as to allow the hood barrel to be disassembled from the front of the zoom lens.

In an embodiment, the zoom lens further includes a barrier block fixed to the front end of the hood barrel and having at least one barrier blade for opening and closing a photographic aperture of the zoom lens.

In an embodiment, the linear guide groove, the inner inclined groove, and the linear guide projection respectively include a plurality of linear guide grooves, a plurality of inner inclined grooves, and a plurality of linear guide projections.

In an embodiment, the rotational transmission groove, the outer inclined groove, and the inward projection respectively include a plurality of rotational transmission grooves, a plurality of outer inclined grooves, and a plurality of inward projections.

The zoom lens can be incorporated in a digital camera.

According to another aspect of the present invention a zoom lens assembling mechanism is provided, including a stationary barrel; a movable barrel extending from the inside of the stationary barrel, and driven to move forward and rearward in an optical axis direction while rotating about the optical axis; a linear guide barrel guided to be movable together with the movable barrel in the optical axis direction and to be rotatable relative to the movable barrel about the optical axis; a linear guide mechanism, provided on the linear guide barrel and the stationary barrel, for guiding the linear guide barrel in the optical axis direction without rotating the linear guide barrel about the optical axis; and at least one lens group guided in the optical axis direction without rotating about the optical axis by the linear guide barrel to be moved in the optical axis direction in a predetermined moving manner in accordance with rotation of the movable barrel to change a focal length of the zoom lens. When the movable barrel is positioned in an operating range thereof including a zooming range of the movable barrel relative to the stationary barrel, the linear guide barrel is guided in the optical axis direction via the linear guide mechanism while the movable barrel moves together with the linear guide barrel in the optical axis direction while rotating about the optical axis relative to the linear guide barrel to move the at least one lens group in a predetermined moving manner. If the movable barrel is moved forward from a frontmost position of the operating range relative to the stationary barrel in order to disassemble an assembly including the movable barrel and the linear guide barrel from the stationary barrel, the linear guide barrel is no longer guided by the linear guide mechanism, and the linear guide barrel moves forward by a predetermined amount of movement in the optical axis direction while rotating together with the movable barrel about the optical axis to thereby disassemble the assembly from the stationary barrel.

Preferably, the zoom lens further includes a rotational barrel positioned around the movable barrel and driven to rotate; and a rotation transmission mechanism for transmitting rotation of the rotational barrel to the movable barrel. The rotation of the rotational barrel is transmitted to the movable barrel via the rotation transmission mechanism when the movable barrel is positioned in the operating range relative to the stationary barrel. If the movable barrel is moved forward from the frontmost position relative to the stationary barrel in order to disassemble the assembly from the stationary barrel, the rotation transmission mechanism is made inoperable between the rotational barrel and the movable barrel to thereby allow the assembly to be disassembled from the stationary barrel without rotating the rotational barrel about the optical axis.

Preferably, the stationary barrel includes a female helicoid formed on an inner peripheral surface of the stationary barrel. The movable barrel includes a male helicoid formed on an outer peripheral surface of the movable barrel to mesh with the female helicoid, the movable barrel being moved forward and rearward in the optical axis direction while rotating about the optical axis in accordance with an engagement of the male helicoid with the female helicoid.

Preferably, the zoom lens assembling mechanism further includes a cam groove formed on an inner peripheral surface of the movable barrel so that a rear end of the cam groove opens at a rear end of the movable barrel; a linear guide slot formed on the linear guide barrel to extend parallel to the optical axis so that a rear end of the linear guide slot opens at a rear end of the linear guide barrel; a lens frame which holds the lens group; a cam follower formed on the lens frame thereon to be engaged in the cam groove; and a linear guide projection formed on the lens frame to be engaged in the linear guide slot. The cam follower and the linear guide projection are respectively engaged in the cam groove and the linear guide slot, at rear ends, thereof when the assembly is moved forward from the stationary barrel to disassemble the assembly from the stationary barrel.

Preferably, the cam follower is formed on the linear guide projection.

In an embodiment, the zoom lens further includes a hood barrel positioned at the front of the zoom lens around the movable barrel, guided in the optical axis direction without rotating about the optical axis; an inward pin fixed to the hood barrel to project radially inwards; and a hood barrel guide groove formed on an outer peripheral surface of the movable barrel, the inward pin being engaged in the hood barrel guide groove so that the hood barrel moves in the optical axis direction via rotation of the movable barrel. The hood barrel guide groove includes an assembling section and an operating section connected to the assembling section so as to extend substantially along a circumferential direction of the movable barrel, wherein one end of the assembling section opens at the front end of the movable barrel. The operating section includes a zooming section in which rotation of the movable barrel causes the hood barrel to move forward and rearward in the optical axis direction. The rotation of the movable barrel causes the hood barrel to move forward and rearward in the optical axis direction to change a distance between a frontmost lens group of the lens groups and the front end of the hood barrel in the optical axis direction in accordance with a variation of the focal length. The hood barrel can be disassembled from the front of the zoom lens by moving the inward pin forward to pull out the inward pin from the hood barrel guide groove when the inward pin is positioned in the one end of the assembling section. The assembly can be dismounted from the stationary barrel by being moved slightly forward from the frontmost position of the movable barrel relative to the stationary barrel when the movable barrel is positioned to have a predetermined rotational position relative to the stationary barrel so as to allow the hood barrel to be disassembled from the front of the zoom lens.

In an embodiment, the zoom lens assembling mechanism further includes a barrier block fixed to the front end of the hood barrel and having at least one barrier blade for opening and closing a photographic aperture of the zoom lens.

In an embodiment, the linear guide mechanism includes a linear guide groove formed on an inner peripheral surface of the stationary barrel to extend parallel to an optical axis of the zoom lens; and a linear guide projection formed on the linear guide barrel to be engaged in the linear guide groove of the stationary barrel. The stationary barrel further includes an inner inclined groove formed on the inner peripheral surface thereof in front of the linear guide groove in an optical axis direction so that a major part of the inner inclined groove is inclined with respect to the linear guide groove, so that one end of the inner inclined groove opens at a front end of the stationary barrel, and so that the other end of the inner inclined groove is connected with the linear guide groove. When the movable barrel is positioned in the operating range thereof, the linear guide projection is engaged in the linear guide groove. In the case where the movable barrel is moved forward from the frontmost position of the operating range relative to the stationary barrel, the inner guide projection is inserted in the inner inclined groove, so that the linear guide barrel moves forward in the optical axis direction while rotating together with the movable barrel.

Preferably, the stationary barrel includes a female helicoid formed on the inner peripheral surface thereof, the threads of the female helicoid extending parallel to the inner inclined groove, wherein the movable barrel includes a male helicoid formed on an outer peripheral surface thereof to mesh with the female helicoid. The movable barrel is moved forward and rearward in the optical axis direction while rotating with respect to the stationary barrel, in accordance with an engagement of the male helicoid with the female helicoid.

The male helicoid and the female helicoid are engaged with each other when the linear guide projection is inserted in either the linear guide groove or the inner inclined groove.

The zoom lens can be incorporated in a digital camera.

The present disclosure relates to subject matter contained in Japanese Patent Application No.2000-26705 (filed on Feb. 3, 2000) which is expressly incorporated herein by reference in its entirety.

BRIEF DESCRIPTION OF THE DRAWINGS

The present invention will be described below in detail with reference to the accompanying drawings in which:

FIG. 14 is a perspective view of the barrier block with an annular pressure plate being removed from the barrier block, viewed from behind the barrier block;

FIG. 17 is a front view of the external barrel that is supported by the external barrel to be freely rotatable about the optical axis, in a state where the barrier drive ring is rotated to one rotational limit thereof to thereby fully close the two pairs of barrier blades;

FIG. 18 is a front view of the external barrel shown in FIG. 17, in a state where the barrier drive ring is rotated to the other rotational limit thereof to thereby fully open the two pairs of barrier blades;

FIG. 22 is a fragmentary developed view of the second cam barrel, showing an embodiment of the contour of each guide groove formed on the second cam barrel.

DESCRIPTION OF THE PREFERRED EMBODIMENT

Figure 1:
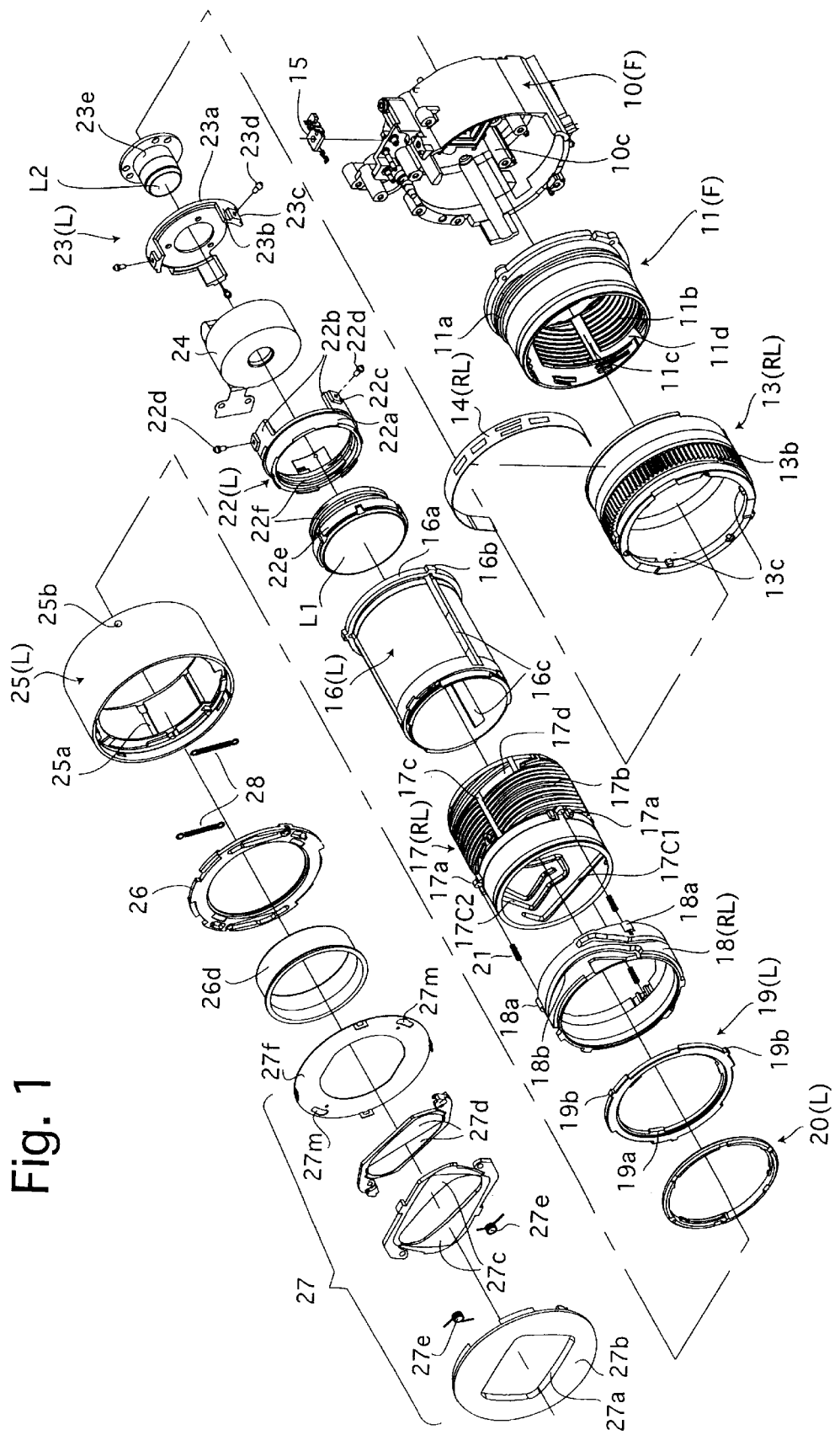
FIG. 1 is an exploded perspective view of an embodiment of a zoom lens according to the present invention, showing the overall structure thereof.

A preferred embodiment of a zoom lens (zoom lens barrel) according to the present invention that is incorporated in a digital camera will be hereinafter discussed. Firstly, the overall structure of the zoom lens will be discussed with reference mainly to FIGS. 1 and 2. In the drawings and the following descriptions, symbols "(F)", "(L)" and "(RL)" which are each appended as a suffix to the reference numeral of some elements of the zoom lens barrel indicate that the element is stationary, the element is movable linearly along an optical axis O of the zoom lens without rotating about the optical axis O, and the element is movable along the optical axis O while rotating about the optical axis O, respectively.

Figure 2:
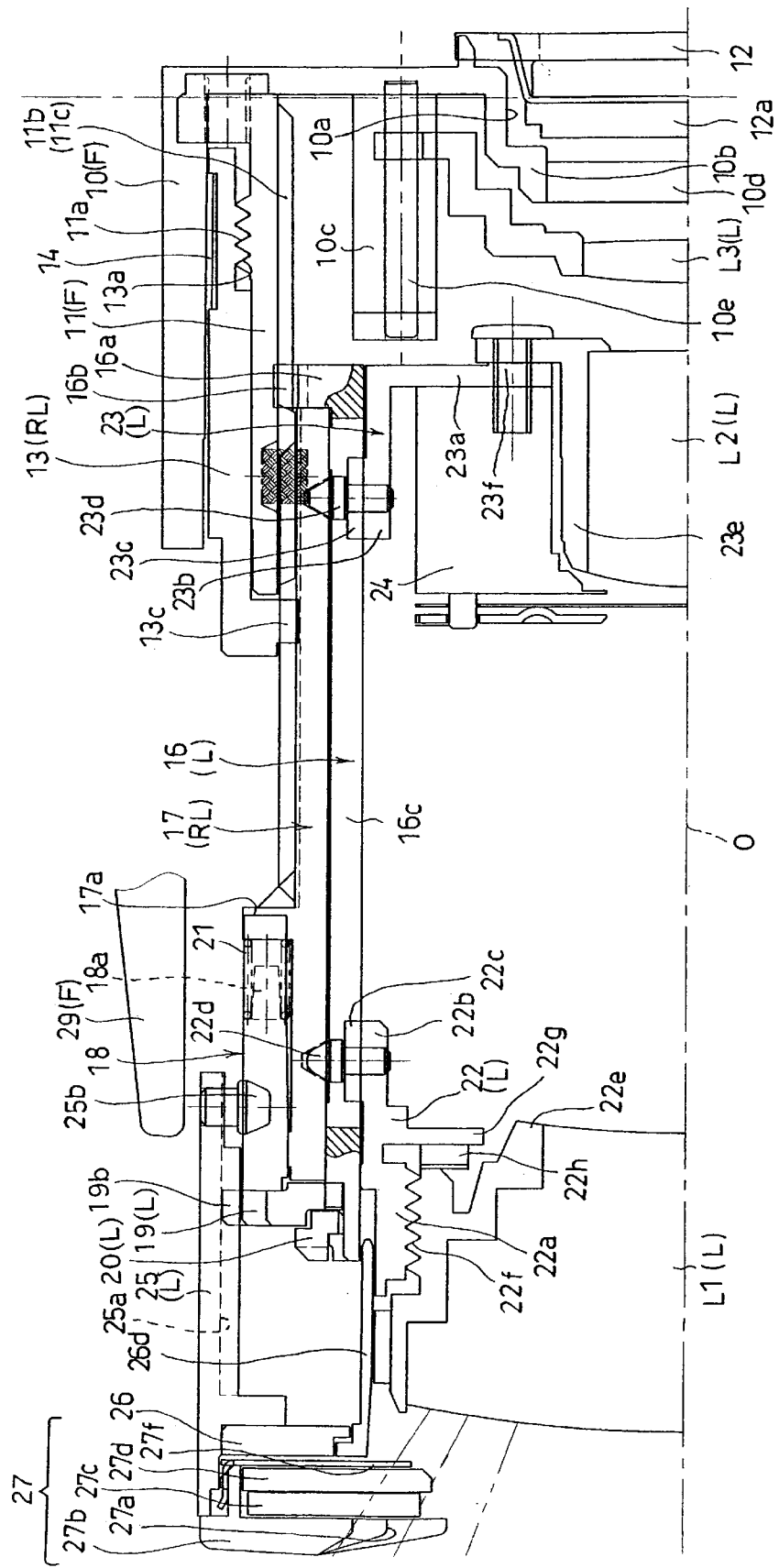
FIG. 2 is an axial cross sectional view of the zoom lens shown in FIG. 1, showing the zoom lens above the optical axis thereof.

The photographic optical system of the zoom lens includes three lens groups; namely, a first lens group (front lens group) L1 (L), a second lens group (middle lens group) L2 (L) and a third lens group (rear lens group) L3 (L), in this order from the object side (the left side as viewed in FIG. 2). The zoom lens performs zooming by moving the first and second lens groups L1 and L2 along the optical axis O relative to the sensitive surface of a stationary CCD 12a (see FIG. 2) and at the same time changing the space between the first and second lens groups L1 and L2 in a predetermined manner. The zoom lens performs a focusing operation by moving the third lens group L3 along the optical axis O to bring an object into focus. The third lens group L3 functions as a focusing lens group which is driven along the optical axis O independently of the axial position of each of the first and second lens groups L1 and L2. Thus, the zoom lens is an internal-focusing type zoom lens having a lens construction which allows the focus to be altered by moving the rearmost lens group provided as a focusing lens group internally within the lens barrel.

The zoom lens is provided with a housing 10(F) which is fixed to a camera body of a digital camera (not shown). The housing 10 can be integral with the camera body to be provided as an element thereof. The zoom lens is provided in the housing 10 with a stationary barrel 11(F) that is fixed to the housing 10. The stationary barrel 11 is provided on an outer peripheral surface thereof with a fine male thread 11a. The stationary barrel 11 is provided on an inner peripheral surface thereof with a female helicoid (female helicoidal thread) 11b and three linear guide grooves 11c (only one is shown in FIG. 1) extending parallel to the optical axis O, i.e., extending in the optical axis direction. The three linear guide grooves 11c are formed to cut across the female helicoid 11b. The three linear guide grooves 11c are formed at 120° intervals (i.e., at an equi-angular distance) about the axis of the stationary barrel 11.

As shown in FIG. 2, the housing 10 is provided with a CCD insertion opening 10a, a filter fixing portion 10b and a focusing lens group guide portion 10c. The CCD 12a which is fixed to a substrate 12 is positioned in the CCD insertion opening 10a. A filter 10d such as a low-pass filter is fixed to the filter fixing portion 10b. The third lens group L3 is guided by the focusing lens group guide portion 10c to be movable in the optical axis direction. The axial position of the third lens group L3 on the optical axis O is determined by the direction of rotation of a feed screw 10e and the angle of rotation (amount of rotation) thereof. The feed screw 10e extends parallel to the optical axis O from the camera body in the focusing lens group guide portion 10c. The feed screw 10e is driven by a pulse motor (not shown) provided in the camera body. The angle of rotation of the feed screw 10e is controlled via an encoder (not shown) of the pulse motor.

The zoom lens is provided on the stationary barrel 11 with a rotational barrel 13 (RL). The rotational barrel 13 is provided on an inner peripheral surface thereof with a fine female thread 13a which meshes with the fine male thread 11a of the stationary barrel 11. The rotational barrel 13 is provided on an outer peripheral surface thereof with a circumferential gear 13b (see FIG. 1). The rotational barrel 13 is driven to rotate about the optical axis O by a drive pinion (not shown) which meshes with the circumferential gear 13b. When the rotational barrel 13 is driven to rotate about the optical axis O, the rotational barrel 13 moves in the optical axis direction while rotating about the optical axis O in accordance with the engagement of the fine female thread 13a with the fine male thread 11a. The rotational barrel 13 is provided at the front end of an inner peripheral surface thereof with three inward projections 13c at 120° intervals about the axis of the rotational barrel 13. As shown in FIG. 1, a flexible coding plate 14 (RL) is fixed on an outer peripheral surface of the rotational barrel 13 along a circumference thereof, while a brush 15 (F) that is in contact with the coding plate 14 is fixed to the housing 10. The brush 15 remains in sliding contact with the coding plate 14 regardless of a movement of the coding plate 14 relative to the brush 15 when the coding plate 14 moves in the optical axis direction in accordance with the engagement of the fine female thread 13a with the fine male thread 11a, so as to sense the rotational position of the rotational barrel 13 as digital and/or analogue information. The fine female thread 13a, which is provided on the rotational barrel 13, is provided as a device for supporting the rotational barrel 13 on the stationary barrel 11 so that the rotational barrel 13 can rotate freely about the optical axis O on the stationary barrel 11. However, alternatively, the rotational barrel 13 can be supported on the stationary barrel 11 so as to be able to rotate freely about the optical axis O without moving in the optical axis direction relative to the stationary barrel 11.

The zoom lens is further provided with a linear guide barrel 16 (L), a first cam barrel 17 (movable barrel) (RL) and a second cam barrel 18 (movable barrel) (RL). The first cam barrel 17 is fitted on the linear guide barrel 16 to be rotatable about the optical axis O relative to the linear guide barrel 16 and to be immovable in the optical axis direction relative to the linear guide barrel 16. The second cam barrel 18 is fitted on the front end of the first cam barrel 17 to be rotatable together with the first cam barrel 17 about the optical axis O and also to be movable in the optical axis direction relative to the first cam barrel 17. The linear guide barrel 16, the first cam barrel 17 and the second cam barrel 18 are assembled in advance as a unit, and the rear of this barrel unit is positioned in the stationary barrel 11. The linear guide barrel 16 is provided at the rear end thereof with an outer flange 16a. A linear guide ring (flange ring) 19(L) is fixed to the front end of the linear guide barrel 16 via a retainer ring 20(L). The first cam barrel 17 is held between the outer flange 16a and the linear guide ring 19, and is rotatable about the optical axis O relative to the linear guide barrel 16 and also movable together with the linear guide barrel 16 in the optical axis direction.

The second cam ring 18, which is fitted on the front end of the first cam barrel 17, is provided at the rear end thereof with three linear guide portions 18a (only two are shown in FIG. 1) at 120° intervals about the axis of the second cam ring 18. Each of the three linear guide portions 18a is provided with a spring holding groove 18a1, and a pair of guide grooves 18a2 positioned on the opposite sides of the spring holding groove 18a1 in a circumferential direction of the second cam ring 18 (see FIGS. 8 and 9). Each of the three linear guide portions 18a is further provided, in each spring holding groove 18a1 at the front end (the left end as viewed in FIG. 8 or 9) of each spring holding groove 18a1, with an engaging projection 18a3. All of the spring holding grooves 18a1 and the pairs of guide grooves 18a2 extend parallel to the optical axis O. The first cam barrel 17 is provided on an outer peripheral surface thereof with three stopper portions 17a (only two are shown in FIG. 1) at 120° intervals about the axis of the first cam barrel 17. Each of the three stopper portions 17a is provided with a stopper projection 17a1, and a pair of guide projections 17a2 positioned on the opposite sides of the stopper projection 17a1 in a circumferential direction of the first cam barrel 17 (see FIG. 4). Each pair of guide projections 17a2 of the first cam barrel 17 are respectively fitted in the corresponding pair of guide grooves 18a2 of the second cam ring 18 to be slidable in the optical axis direction relative to the second cam ring 18, with a compression spring 21 being held between each engaging projection 18a3 and the corresponding stopper projection 17a1. Due to this structure, the second cam barrel 18 can slide on the first cam barrel 17 in the optical axis direction without rotating about the optical axis O relative to the first cam barrel 17. The compression springs 21 constantly bias the second cam barrel 18 toward the front of the zoom lens, so that the front end of the second cam barrel 18 is usually in press-contact with the linear guide ring 19. The second cam barrel 18 can move rearward, toward the rear of the zoom lens, against the spring force of the compression springs 21 by an amount of movement corresponding to a predetermined clearance in the optical axis direction between the guide grooves 18a2 and the guide projections 17a2. The second cam barrel 18 can also be slightly inclined with respect to the first cam barrel 17 (i.e., with respect to the optical axis O) by an amount of inclination corresponding to a predetermined clearance in a radial direction between the inner peripheral surface of the second cam barrel 18 and the corresponding outer peripheral surface of the first cam barrel 17.

The first cam barrel 17 is provided on an outer peripheral surface thereof with a male helicoid (male helicoidal thread) 17b that is engaged with the female helicoid 11b of the stationary barrel 11, and three rotation transmission grooves 17c that extend parallel to the optical axis O. The three rotation transmission grooves 17c are formed so as to cut across the male helicoid 17b. The three rotation transmission grooves 17c are formed at 120° intervals about the axis of the first cam barrel 17. The three inward projections 13c of the rotational barrel 13 are respectively engaged with the three rotation transmission grooves 17c to be relatively slidable to each other. The three rotation transmission grooves 17c and the corresponding three inward projection 13c constitute a rotation transmission mechanism. The linear guide barrel 16 is provided on the outer flange 16a thereof with three linear guide projections 16b at 120° intervals about the axis of the linear guide barrel 16. Each linear guide projection 16b extends radially outwards to be engaged with the corresponding linear guide groove 11c of the stationary barrel 11. The three linear guide projections 16b and the corresponding linear guide grooves 11c constitute a linear guide mechanism. The linear guide barrel 16 is further provided with three linear guide slots 16c at 120° intervals about the axis of the linear guide barrel 16 so that the circumferential positions of the three linear guide slots 16c coincide with those of the three linear guide projections 16b. Each of the three linear guide slots 16c penetrates the linear guide barrel 16 radially and extends parallel to the optical axis O.

Figure 4:
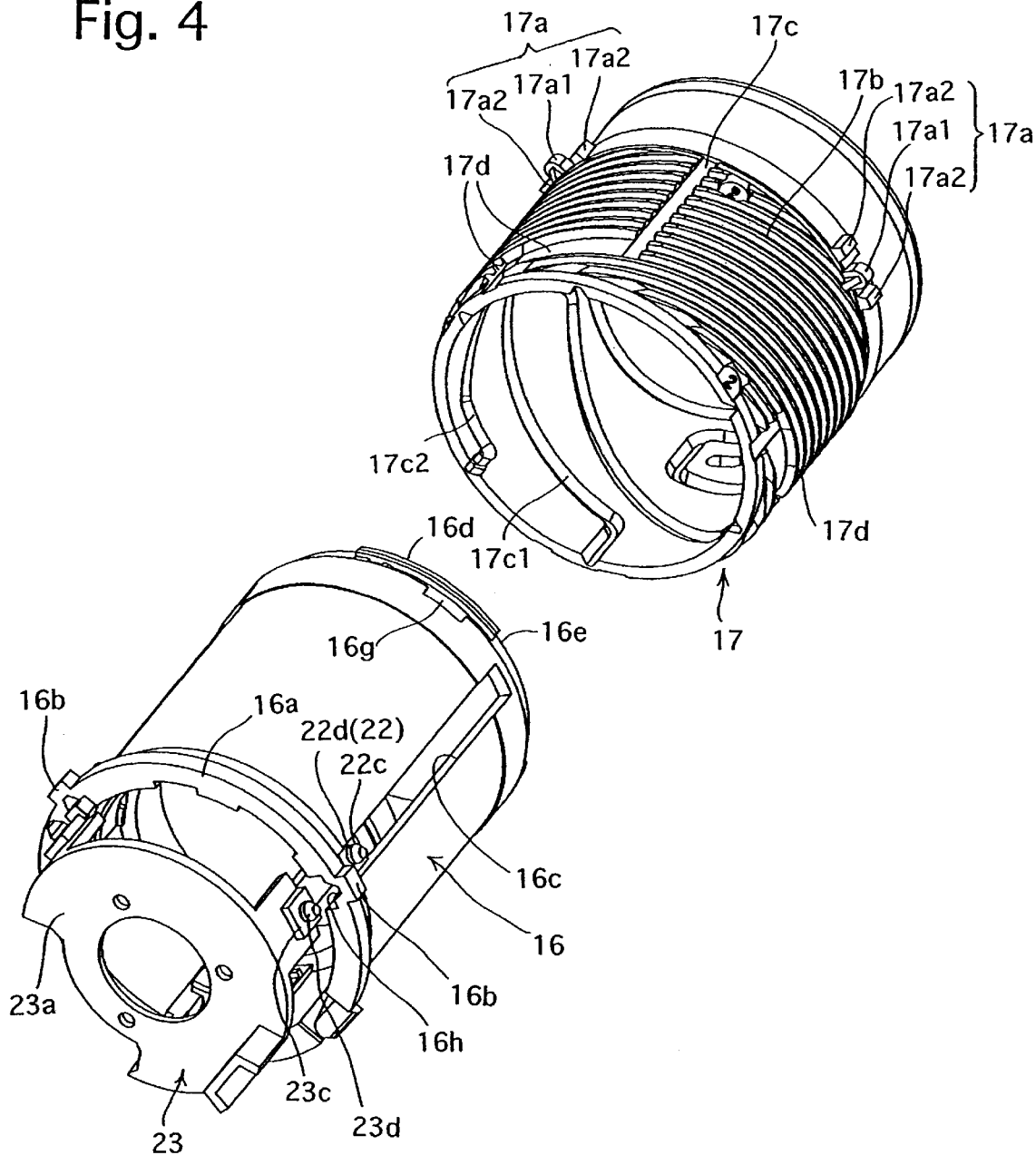
FIG. 4 is an exploded perspective view of the first cam barrel shown in FIG. 3, a linear guide barrel, a first lens frame and a second lens frame.
Figure 5:
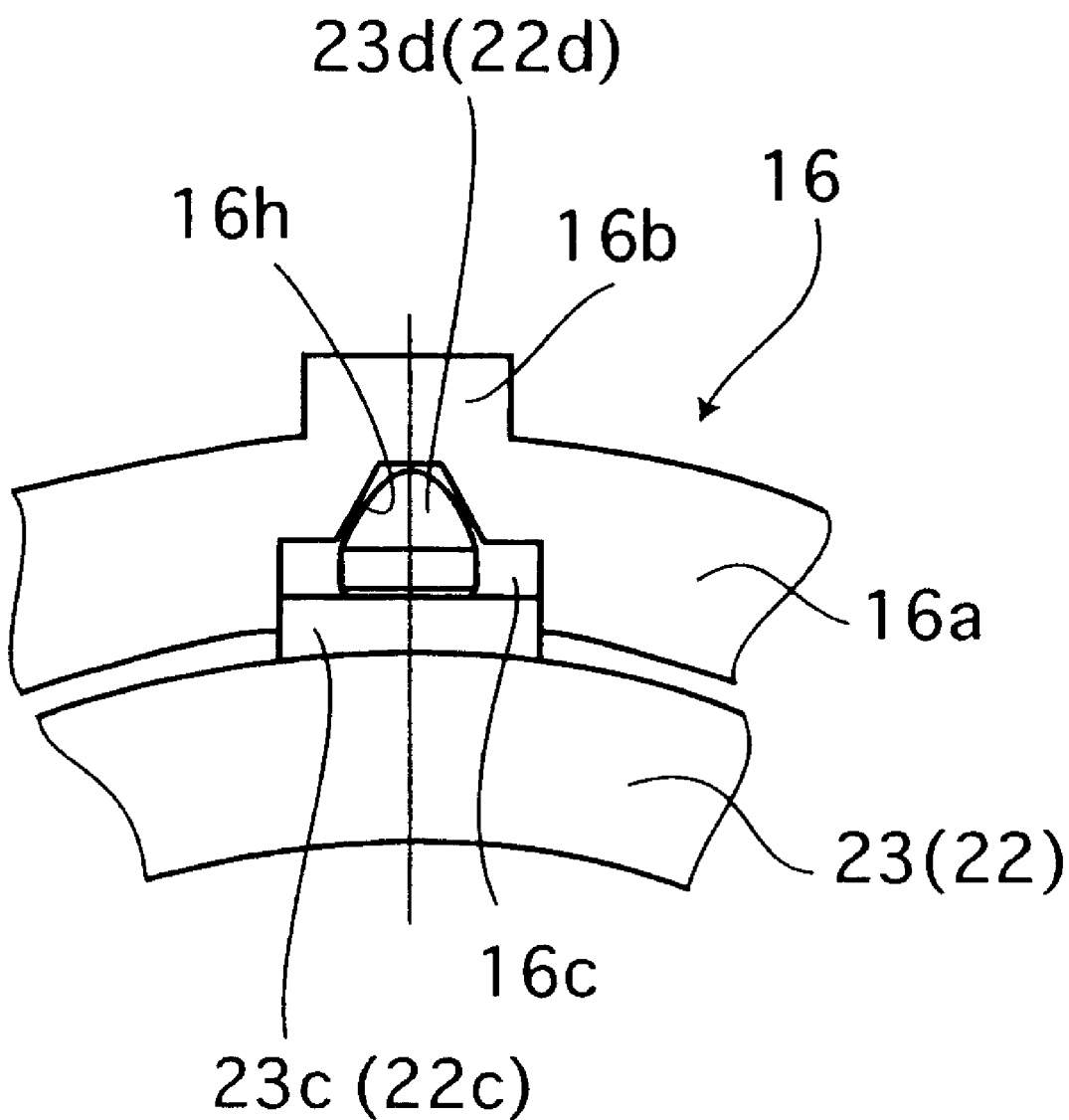
FIG. 5 is a fragmentary rear view of the linear guide barrel and the first lens frame, showing the periphery of an insertion groove of the linear guide barrel.
Figure 6:
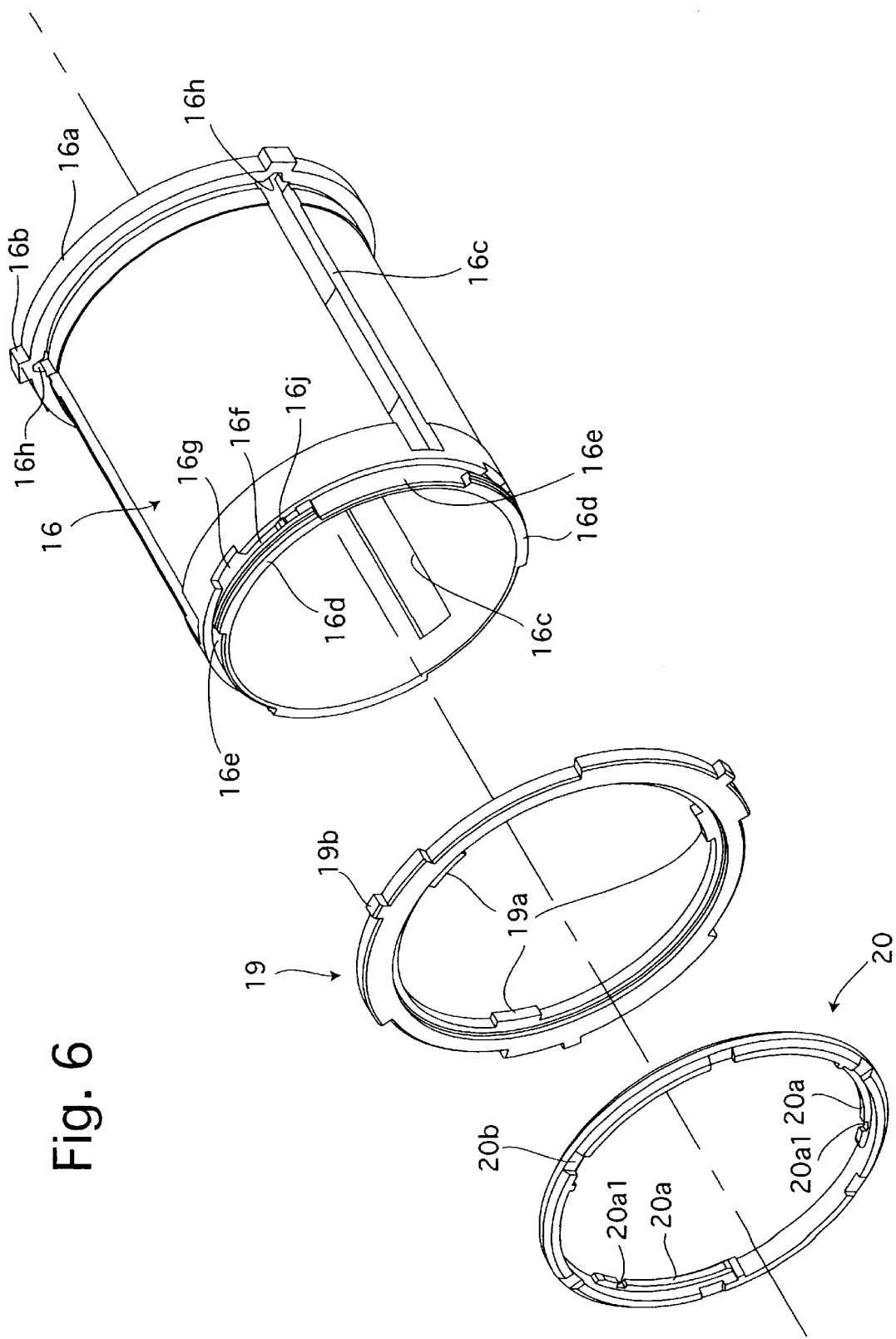
FIG. 6 is an exploded perspective view of the linear guide barrel, a linear guide ring and a retainer ring.

As can be seen in FIGS. 4, 5 and 6, each of the three linear guide slots 16c opens at the rear end of the linear guide barrel 16, and the rear end of each linear guide slot 16c is covered by the corresponding part of the outer flange 16a and the corresponding linear guide projection 16b at the radially outer side of the linear guide barrel 16. The outer flange 16a is provided with three insertion grooves 16h which respectively extend along a portion of each three linear guide slots 16c from the front end of the outer flange 16a to each respective rear end of the three linear guide slots 16c (i.e., the rear end of the outer flange 16a), so that a follower pin (cam follower) 22d and a follower pin (cam follower) 23d can be inserted into each linear guide slot 16c from the corresponding insertion groove 16h.

When the barrel unit which includes the linear guide barrel 16, the first cam barrel 17 and the second cam barrel 18 is coupled to the stationary barrel 11 and the rotational barrel 13, each of the three linear guide projections 16b of the linear guide barrel 16 is inserted into the corresponding linear guide groove 11c of the stationary barrel 11 via a corresponding introducing groove (inner inclined groove) lid formed on an inner peripheral surface of the stationary barrel 11, and each of the three inward projections 13c of the rotational barrel 13 is inserted into the corresponding rotation transmission groove 17c of the first cam barrel 17 via a corresponding introducing groove (outer inclined groove) 17d formed on an outer peripheral surface of the first cam barrel 17. After each linear guide projection 16b and each inward projection 13c are inserted into the corresponding linear guide groove 11c and the corresponding rotation transmission groove 17c, respectively, the female helicoid 11b of the stationary barrel 11 and the male helicoid 17b of the first cam barrel 17 mesh with each other.

FIG. 2 shows a state where the barrel unit, which includes the linear guide barrel 16, the first cam barrel 17 and the second cam barrel 18, has been coupled to the stationary barrel 11 and the rotational barrel 13. In this state, rotating the rotational barrel 13 about the optical axis O via the gear 13b causes the rotational barrel 13 to move in the optical axis direction while rotating about the optical axis O due to the engagement of the fine female thread 13a with the fine male thread 11a. At the same time, the rotation of the rotational barrel 13 is transmitted to the first cam barrel 17 and the second cam barrel 18, which is fitted on the first cam barrel 17, due to the engagement of the inward projections 13c with the rotation transmission grooves 17c, so that the first cam barrel 17 and the second cam barrel 18 rotate about the optical axis O. At this time, the first cam barrel 17 and the second cam barrel 18 also move in the optical axis direction O due to the engagement of the male helicoid 17b with the female helicoid 11b. Furthermore, the linear guide barrel 16 moves in the optical axis direction without rotating about the optical axis O due to the engagement of the linear guide projections 16b with the linear guide grooves 11c, and at the same time the first and second cam barrels 17 and 18, which rotate about the optical axis O relative to the linear guide barrel 16, move together with the linear guide barrel 16 in the optical axis direction.

Figure 3:
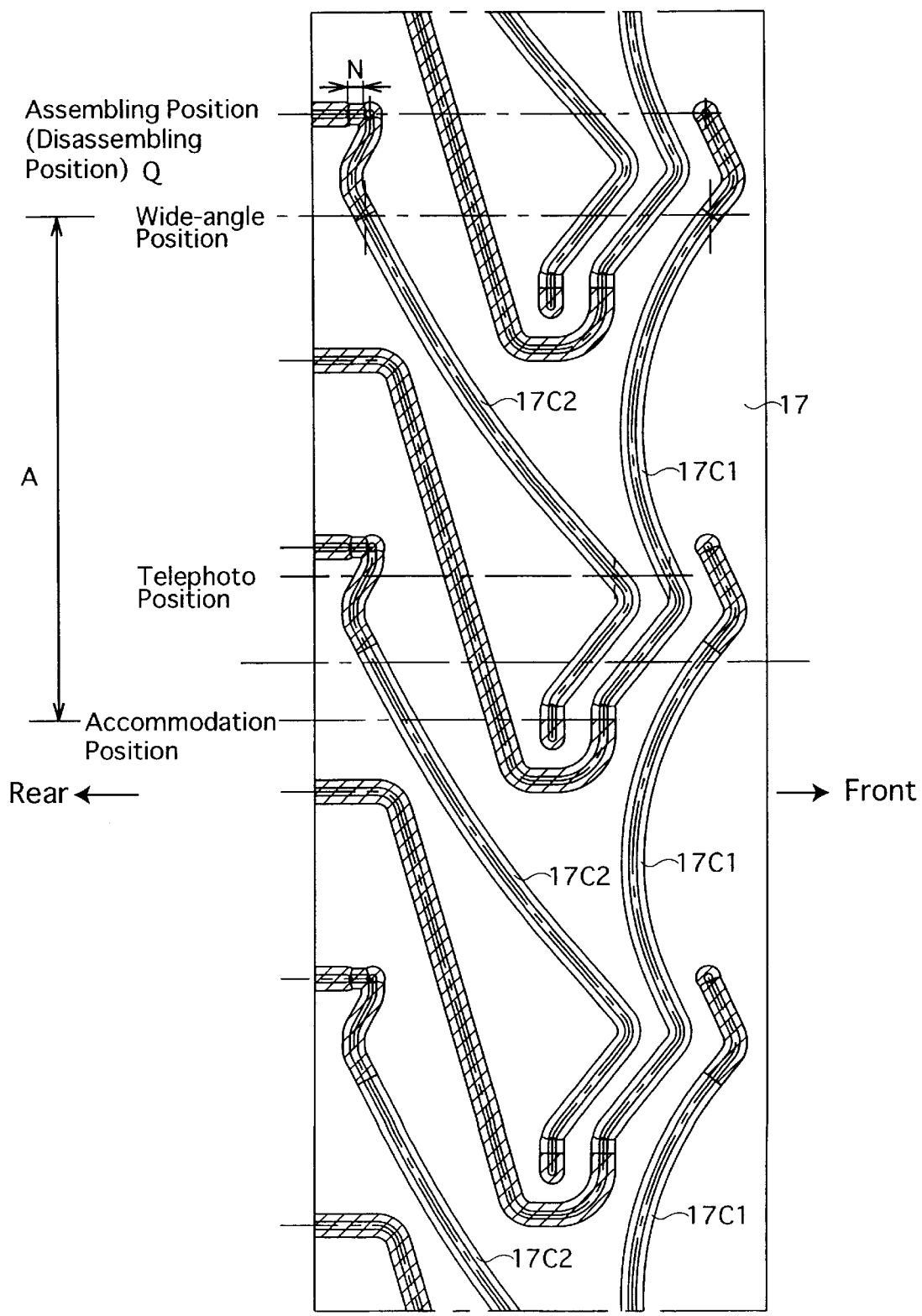
FIG. 3 is a developed view of the inner peripheral surface of a first cam barrel, showing the contours of first and second cam grooves formed on the inner peripheral surface of the first cam barrel.

The first cam barrel 17 is provided on an inner peripheral surface thereof with three first cam grooves 17C1 for driving the first lens group L1, and three second cam grooves 17C2 for driving the second lens group L2. FIG. 3 is a developed view of the inner peripheral surface of the first cam barrel 17, showing the contours of the first and second cam grooves 17C1 and 17C2. The three first cam grooves 17C1 are formed on the inner peripheral surface of the first cam barrel 17 at 120° intervals about the axis of the first cam barrel 17. Likewise, the three second cam grooves 17C2 are formed on the inner peripheral surface of the first cam barrel 17 at 120° intervals about the axis of the first cam barrel 17. Each of the first and second cam grooves 17C1 and 17C2 has three predetermined positions: an accommodation position, a telephoto position and a wide-angle, in this order along the direction of rotation of the first cam barrel 17 (the vertical direction as viewed in FIG. 3). The telephoto position shown in FIG. 3 of each cam groove 17C1 and 17C2 determines the telephoto extremity of the corresponding lens groups L1 and L2, respectively; the wide-angle position of each cam groove 17C1 and 17C2 determines the wide-angle extremity of the corresponding lens groups L1 and L2, respectively; and the accommodation position of each cam groove 17C1 and 17C2 determines the position of the corresponding lens groups Ld1 and L2, respectively, when the power of the digital camera is turned OFF. The angle of rotation from the accommodation position to the wide-angle extremity position is shown by "A" in FIG. 3.

The zoom lens is provided with a first lens frame 22(L) and a second lens frame 23(L) which support the first lens group L1 and the second lens group L2, respectively. The first lens frame 22 is guided by the first cam grooves 17C1 and the linear guide slots 16c to be movable in the optical axis direction without rotating about the optical axis O. Likewise, the second lens frame 23 is guided by the second cam grooves 17C2 and the linear guide slots 16c to be movable in the optical axis direction without rotating about the optical axis O. The first lens frame 22 is provided with three resilient extending pieces 22b which extend rearward from a cylindrical portion 22a of the first lens frame 22. The three resilient extending pieces 22b are formed on the first lens frame 22 at 120° intervals about the axis of the first lens frame 22. Each resilient extending piece 22b is provided on a radially outer surface thereof with a square projection 22c which extends radially outwards to be fitted in the corresponding linear guide slot 16c in a slidable manner in the optical axis direction. Each resilient extending piece 22b is further provided on top of each square projection 22c with a follower pin 22d, which is fixed to the resilient extending piece 22b to extend radially outwards. Each square projection 22c is formed so that the opposite faces thereof, which are respectively in sliding contact with the side faces of the corresponding linear guide slot 16c, extend parallel to each other. The zoom lens is provided with a first lens holder 22e which encloses the first lens group L1 to hold the same. The first lens holder 22e is fixed to the cylindrical portion 22a of the first lens frame 22 via male and female threads 22f which are formed on an outer peripheral surface of the first lens holder 22e and an inner peripheral surface of the cylindrical portion 22a, respectively. The position of the first lens group L1 relative to the first lens frame 22 in the optical axis direction can be adjusted by varying the amount of engagement between the male and female threads 22f. A wave washer 22h is held between the holder 22e and an inner flange 22g of the first lens frame 22 to remove the play between the first lens holder 22e (or the first lens group L1) and the first lens frame 22 (see FIG. 2).

The second lens frame 23 is provided with three resilient extending pieces 23b which extend forward from an annular plate portion 23a of the second lens frame 23. The three resilient extending pieces 23b are formed on the second lens frame 23 at 120° intervals about the axis of the second lens frame 23. Each resilient extending piece 23b is provided on a radially outer surface thereof with a square projection 23c which extends radially outwards to be fitted in the corresponding linear guide slot 16c in a slidable manner in the optical axis direction. Each resilient extending piece 23b is further provided on top of each square projection 23c with the aforementioned follower pin 23d, which is fixed to the resilient extending piece 23b to extend radially outwards. The square projections 23c and the follower pins 23d of the second lens frame 23 are identical to the square projections 22c and the follower pins 22d of the first lens frame 22 except that the resilient extending pieces 23b of the second lens frame 23 extend in the direction opposite to the resilient extending pieces 22b of the first lens frame 22 in the optical axis direction. The zoom lens is provided with a second lens holder 23e which encloses the second lens group L2 to hold the same. The second lens holder 23e is fixed to the annular plate portion 23a of the second lens frame 23 via set screws 23f. A shutter block 24 is provided around the second lens group L2. The shutter block 24 is fixed to the annular plate portion 23a of the second lens frame 23 via the set screws 23f that are screwed into the rear of the shutter block 24. The shutter block 24 functions to interrupt light bundles which are incident on the CCD 12a at a shutter release operation.

Each of the first and second lens frames 22 and 23 is guided linearly in the optical axis direction without rotating about the optical axis O by the engagement of each of the three square projections 22c and corresponding each of the three square projections 23c with each common corresponding linear guide slot of the three linear guide slots 16c. Each follower pin 22d penetrates the corresponding linear guide slot 16c of the linear guide barrel 16 to be engaged with the corresponding first cam groove 17C1 of the first cam barrel 17, which is fitted on the linear guide barrel 16 to be rotatable about the optical axis relative to linear guide barrel 16. Likewise, each follower pin 23d penetrates the corresponding linear guide slot 16c of the linear guide barrel 16 to be engaged with the corresponding second cam groove 17C2 of the first cam barrel 17. When the first and second lens frames 22 and 23 are placed in the linear guide barrel 16 and the first cam barrel 17, firstly each of the three square projections 22c and corresponding one of the three square projections 23c are inserted into a corresponding linear guide slot of the three linear guide slots 16c from the rear end face of the linear guide barrel 16. At the same time, each of the three follower pins 22d and corresponding one of the three follower pins 23d are inserted into corresponding one of the three insertion grooves 16h to be fitted in the corresponding first and second cam grooves 17C1 and 17C2, respectively. It should be noted that the hatched areas of the first and second cam grooves 17C1 and 17C2 in FIG. 3 are used solely for the purpose of inserting each follower pin 22d or 23d into the corresponding cam groove 17Cl or 17C2 during assembly, and thus are not used when the zoom lens is in operation.

According to the above described guide structure, rotating the rotational barrel 13 about the optical axis o causes the barrel unit which includes the linear guide barrel 16, the first cam barrel 17 and the second cam barrel 18 to move in the optical axis direction. During this movement of the barrel unit, the first and second cam barrels 17 and 18 rotate together about the optical axis O, but the linear guide barrel 16 does not rotate about the optical axis O. As a result, the first lens frame 22 (the first lens group L1) and the second lens frame 23 (the second lens group L2) linearly move in the optical axis direction while changing the space therebetween in accordance with the contours of the first and second cam grooves 17C1 and 17C2 to thereby carry out a zooming operation.

Figure 7:
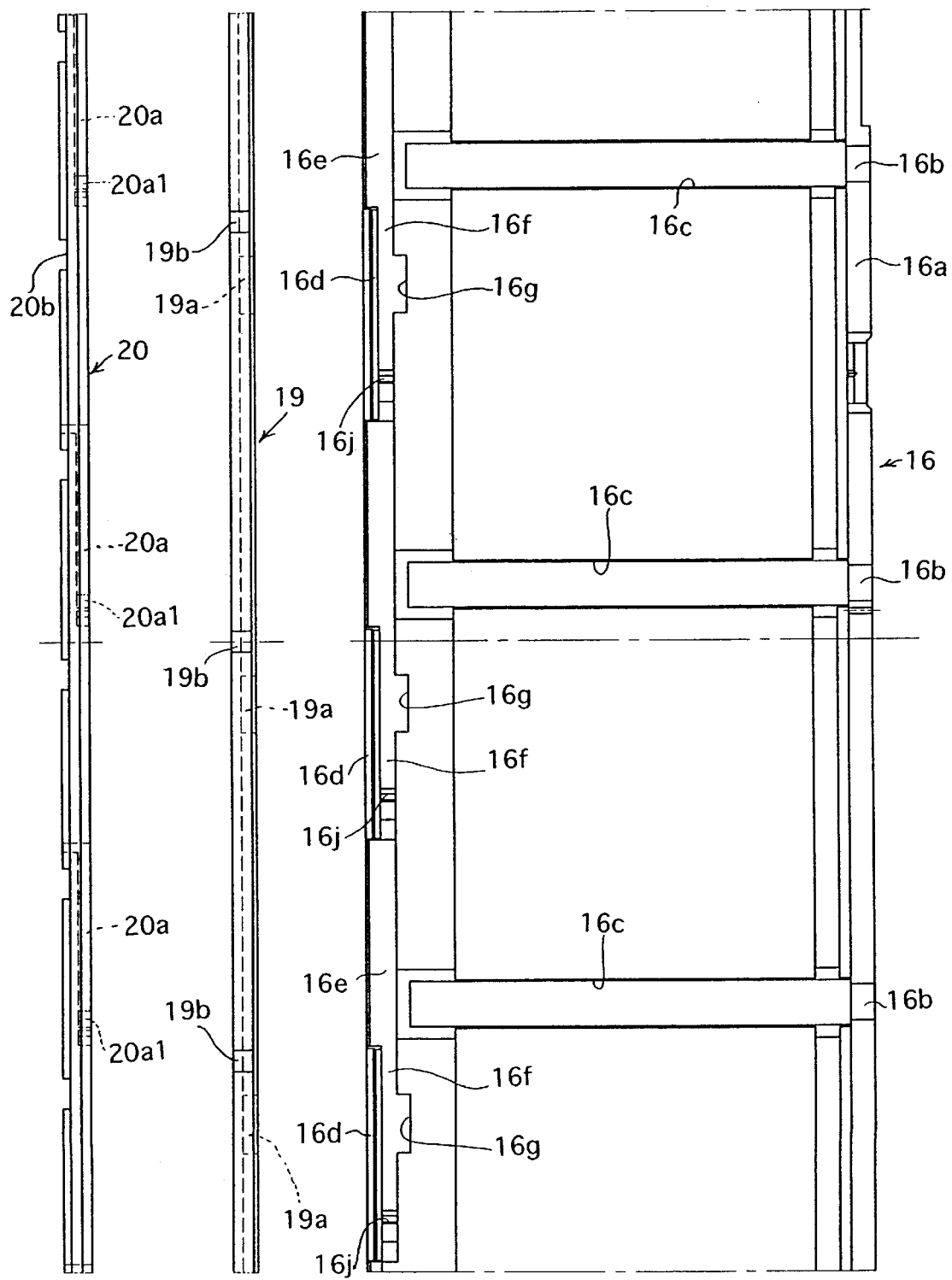
FIG. 7 is a developed view of the linear guide barrel, the linear guide ring and the retainer ring.

The coupling structure of the linear guide ring 19 and the retainer ring 20 to the front end of the linear guide barrel 16 will be hereinafter discussed with reference to FIGS. 6 and 7. The linear guide barrel 16 is provided, at the front end thereof at 120° intervals about the axis of the linear guide barrel 16, with three engaging lugs 16d each of which extends radially outwards. A receiving area 16e is formed between any two adjacent engaging lugs 16d of the linear guide barrel 16 in order to receive one of three radially inward projections 19a of the linear guide ring 19. The linear guide barrel 16 is provided immediately behind the three engaging lugs 16d with three grooves 16f, respectively. The radius of the linear guide barrel 16 from the axis of the linear guide barrel 16 to the bottom surface of each groove 16f is identical to the radius from the axis of the linear guide barrel 16 to the surface of each receiving area 16e. The linear guide barrel 16 is provided behind the three engaging lugs 16d with three recesses 16g, respectively, each of which is connected with the corresponding groove 16f. Each recess 16g is recessed rearward (toward the right as viewed in FIG. 7) in the direction parallel to the optical axis O, i.e., in the optical axis direction.

On the other hand, the linear guide ring 19 is provided with the aforementioned three inward projections 19a at 120° intervals about the axis of the linear guide ring 19. The three inward projections 19a can be inserted into the three receiving areas 16e, respectively. If the linear guide ring 19 is rotated about the axis thereof clockwise as viewed in FIG. 6 relative to the linear guide barrel 16 with the three inward projections 19a being properly inserted into the three receiving areas 16e, respectively, each inward projection 19a slides into the corresponding groove 16f. The linear guide ring 19 is provided with three radially outward projections 19b at 120° intervals about the axis of the linear guide ring 19. The circumferential positions of the three outward projections 19b are precisely determined with reference to the circumferential positions of the three inward projections 19a.

The retainer ring 20 is provided with radially inward blades 20a at 120° intervals about the axis of the retainer ring 20. The three inward blades 20a can be inserted into the three receiving areas 16e of the linear guide barrel 16, respectively. If the retainer ring 20 is rotated about the axis thereof clockwise as viewed in FIG. 6 relative to the linear guide barrel 16 with the three inward blades 20a being properly inserted into the three receiving areas 16e, respectively, each inward blade 20a slides into the corresponding groove 16f. The retainer ring 20 is provided on the front end face thereof with a plurality of grooves 20b which are recessed rearward, toward the linear guide barrel 16, so that a pin face wrench (not shown) can be engaged with the recessed portions 20b to rotate the retainer ring 20 relative to the linear guide barrel 16.

When the linear guide ring 19 is fixed to the front end of the linear guide barrel 16, firstly the three inward projections 19a are respectively inserted into the three receiving areas 16e, and then the linear guide ring 19 is rotated about the axis thereof clockwise as viewed in FIG. 6 relative to the linear guide barrel 16 so that each inward projection 19a slides into the corresponding groove 16f. Subsequently, each inward projection 19a is made to be fitted in the corresponding recess 16g. This engagement of each inward projection 19a with the corresponding recess 16g determines the fixed circumferential position of the linear guide ring 19 relative to the linear guide barrel 16. Subsequently, the inward blades 20a of the retainer ring 20 are respectively inserted into the three receiving areas 16e, and then the retainer ring 20 is rotated about the axis thereof clockwise as viewed in FIG. 6 relative to the linear guide barrel 16 so that each inward blade 20a slides into the corresponding groove 16f and presses the corresponding inward projection 19a into the corresponding recess 16g. This prevents the linear guide ring 19 from moving in the optical axis direction relative to the linear guide barrel 16. In this state, since each of the three inward blades 20a of the retainer ring 20 is held in one of the three grooves 16f between the corresponding engaging lug 16d and the corresponding inward projection 19a, the inward blades 20a and the engaging lugs 16d function to prevent the linear guide ring 19 from coming off the front end of the linear guide barrel 16. Between the linear guide barrel 16 and the retainer ring 20 is provided a click-stop device which prevents the retainer ring 20 from rotating counterclockwise as viewed in FIG. 6 so that the retainer ring 20 cannot come off the front end of the linear guide barrel 16 after the retainer ring 20 is properly engaged with the linear guide barrel 16. Three indentations 20a1 which are formed on the retainer ring 20 and corresponding three detents 16j which are formed on the linear guide barrel 16 to be respectively engaged with the three indentations 20a1 constitute the elements of the click-stop device (see FIGS. 6 and 7).

Accordingly, the outward projections 19b of the linear guide ring 19 that is fixed to the front end of the linear guide barrel 16 in the above described manner are located at predetermined specific positions (angular positions) relative to the linear guide projections 16b. The zoom lens is provided at the front thereof with an external barrel (a hood barrel) 25(L). The external barrel 25 is provided, on an inner peripheral surface thereof at 120° intervals about the axis of the external barrel 25, with three linear guide grooves 25a which extend parallel to the optical axis O. The three outward projections 19b of the linear guide ring 19 are respectively engaged with the three linear guide grooves 25a to guide the external barrel 25 to move in the optical axis direction without rotating about the optical axis O. The external barrel 25 is provided at the rear end thereof with three radially inward pins (inward projections) 25b which are respectively engaged with three guide grooves (hood barrel guide grooves) 18b formed on outer peripheral surface of the second cam barrel 18 at 120° intervals about the axis thereof.

Figure 8:
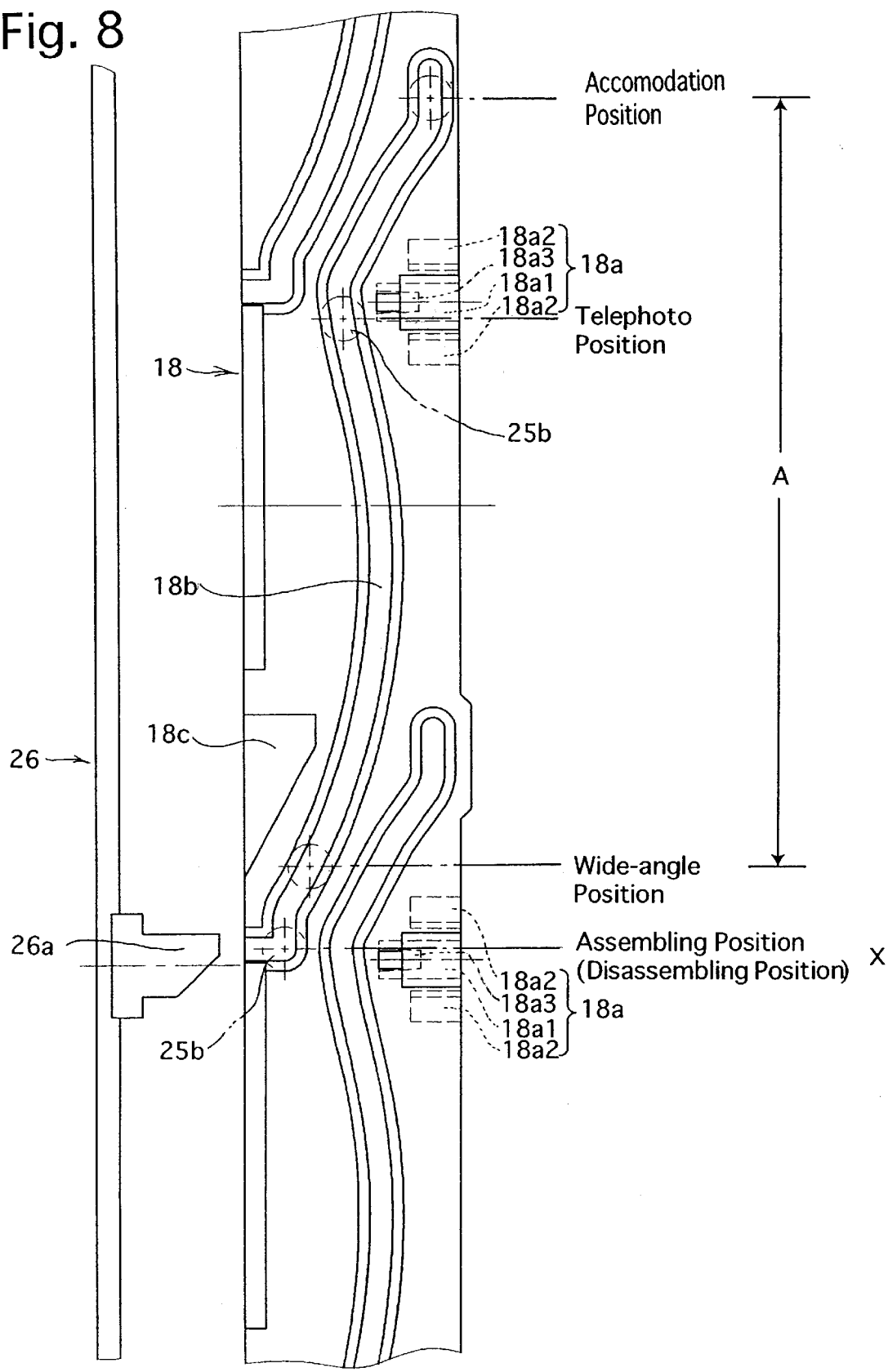
FIG. 8 is a developed view of a second cam barrel and a barrier drive ring, showing the positional relationship therebetween when the zoom lens is set at the telephoto extremity thereof (when the zoom lens is in a ready-to-photograph state)

As shown in FIG. 8, each of the three guide grooves 18b of the second cam barrel 18 defines an assembling position (or a disassembling position) X at which the three inward pins 25b of the external barrel 25 are respectively inserted into or taken out of the three guide grooves 18b of the second cam barrel 18. Each of the three guide grooves 18b further defines an accommodation position, a telephoto position and a wide-angle extremity, which determine the accommodation position, the telephoto extremity and the wide-angle extremity of the first cam barrel 17, respectively. The three guide grooves 18b are formed to move the external barrel 25 in the optical axis direction in accordance with the rotational position of the second cam barrel 18, which rotates together with the first cam barrel 17. More specifically, the three guide grooves 18b are formed to make the external barrel 25 function as a movable lens hood so that the external barrel 25 advances relative to the second cam barrel 18 (i.e., the first lens group L1) when the zoom lens is set at the telephoto extremity thereof having a narrow angle of view while the external barrel 25 retreats relative to the second cam barrel 18 when the zoom lens is set at the wide-angle extremity thereof having a wide angle of view. The external barrel 25 is positioned in the wide-angle extremity thereof and the telephoto extremity thereof in FIG. 10 and FIG. 11, respectively.

If the external barrel 25 is pressed rearward (i.e., toward the camera body) by an external force when the camera is in use, the compression springs 21 function as shock absorbers which can absorb at least part of such an external force since the compression springs 21 are positioned between the first cam barrel 17, which guides the first and second lens groups L1 and L2 in the optical axis direction, and the second cam barrel 18, which guides the external barrel 25 in the optical axis direction. Such an external force is transmitted partly to the first cam barrel 17 after having been absorbed to some extent by the compression springs 21, which prevents large external forces from being applied to the first cam barrel 17. Consequently, the precision of the axial position of each of the first and second lens groups L1 and L2 is influenced negligibly by external forces applied to the external barrel 25. In FIG. 2, the reference numeral 29(F) designates a stationary external barrel which is integral with the camera body. The external barrel 25 advances and retreats with respect to the stationary external barrel 29.

Figure 13:
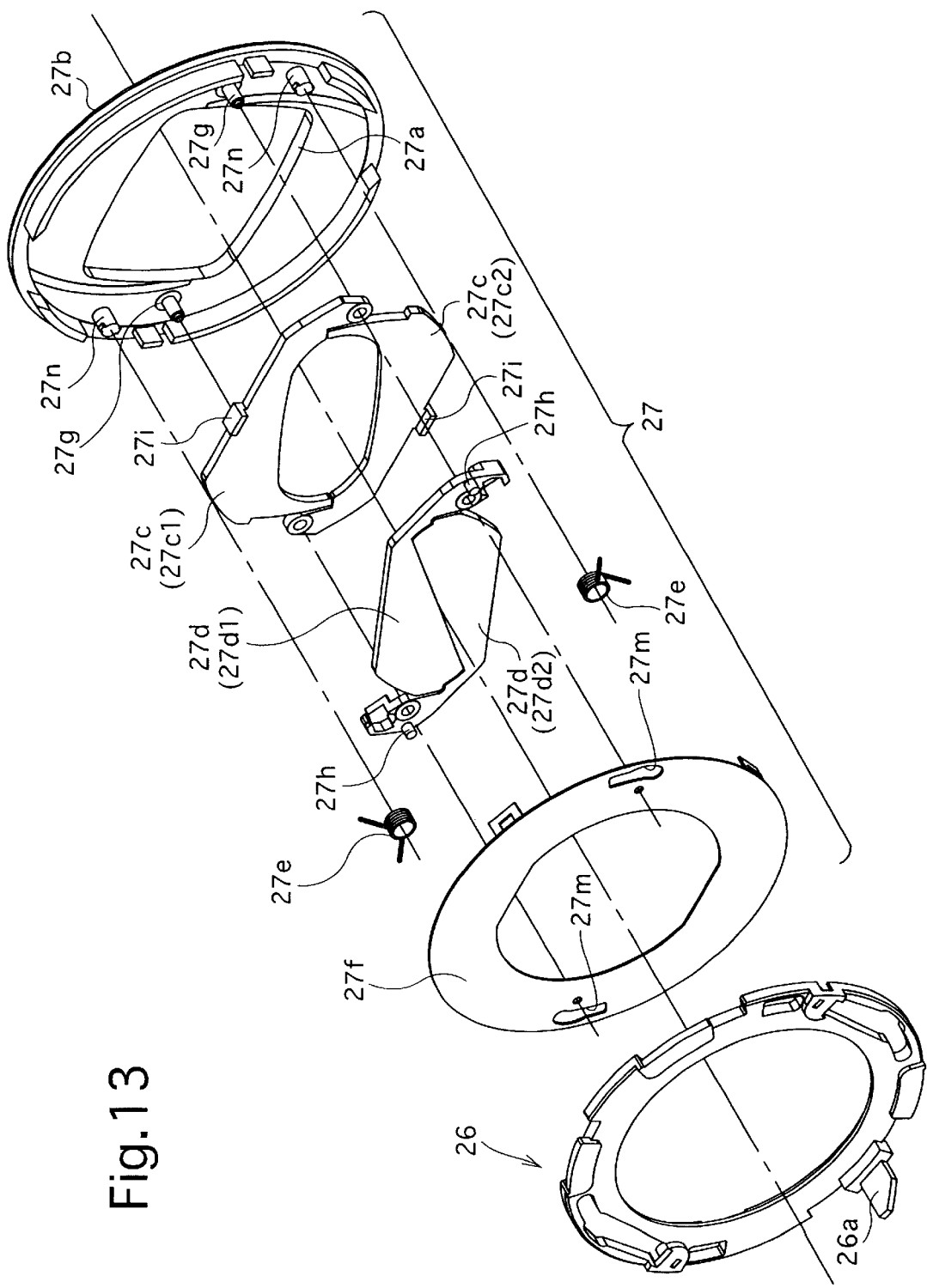
FIG. 13 is an exploded perspective view of the barrier block, viewed from behind the barrier block.
Figure 15C:
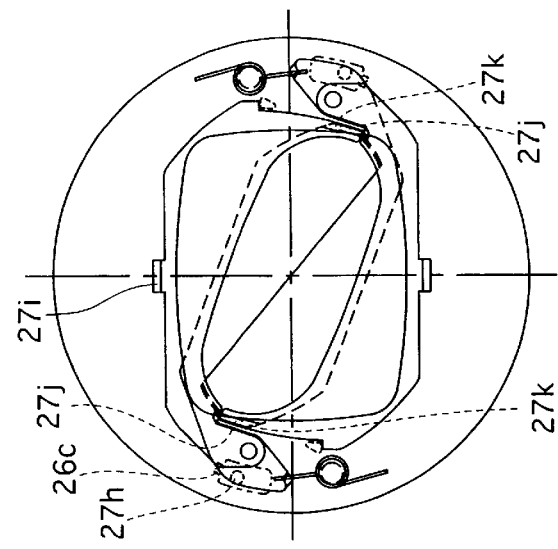
FIG. 15C is a schematic front view of the barrier block, showing the two pairs of barrier blades in a fully closed position.
Figure 15B:
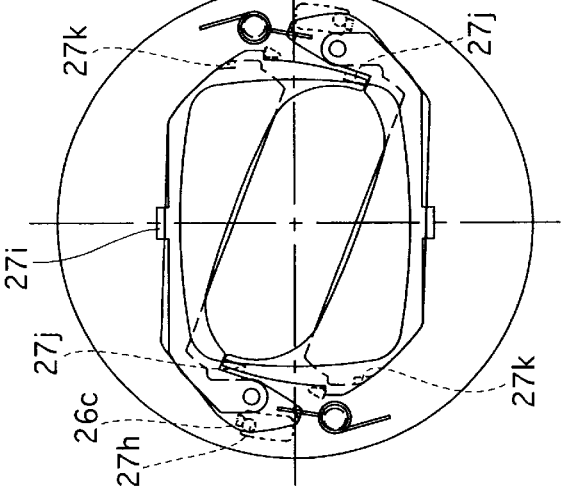
FIG. 15B is a schematic front view of the barrier block, showing the two pairs of barrier blades in a half-closed position.
Figure 15A:
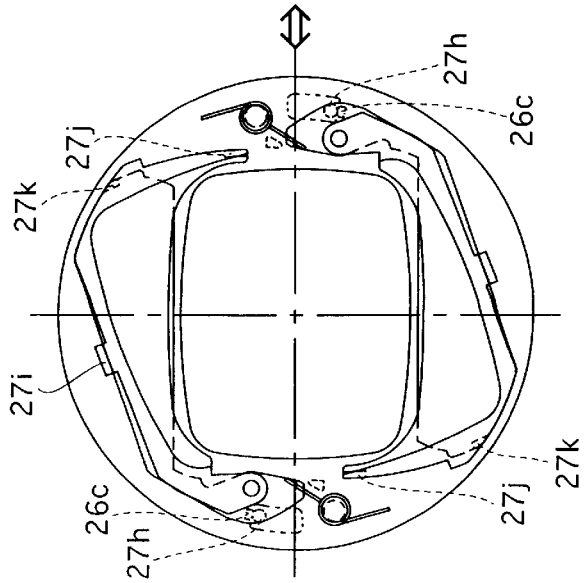
FIG. 15A is a schematic front view of the barrier block, showing two pairs of barrier blades in a fully open position.

The external barrel 25 is provided, at the front thereof in the radially inner side of the external barrel 25, with a barrier drive ring 26, so that the barrier drive ring 26 can rotate about the optical axis O. The barrier drive ring 26 functions to open and close two pairs of barrier blades 27c and 27d (i.e. the front pair of barrier blades 27c and the rear pair of barrier blades 27d) by rotating about the optical axis O. The two pairs of barrier blades 27c and 27d together function as a lens protection cover for protecting the front surface of the first lens group L1 from getting scratched, etc., when the digital camera is not in use. The barrier block 27 is provided with a panel 27b having a photographic aperture 27a, the aforementioned two pairs of barrier blades 27c and 27d supported by the panel 27b therebehind to open and close the photographic aperture 27a, and two torsion springs 27e which constantly bias the two pairs of barrier blades 27c and 27d in a direction to close the photographic aperture 27a. The barrier block 27 is further provided with an annular pressure plate 27f which holds the two pairs of barrier blades 27c and 27d and the torsion springs 27e between the panel 27b and the pressure plate 27f. The barrier block 27 having such elements is assembled in advance as a unit. The panel 27b is provided on a rear face thereof with two pivots 27g (see FIGS. 13 and 14) and two engaging pins 27n. The upper front barrier blade 27c1 of the front pair of barrier blades 27c and the upper rear barrier blade 27d1 of the rear pair of barrier blades 27d are pivoted at corresponding one of the two pivots 27g (the right pivot 27g as viewed in FIG. 13), while the lower front barrier blade 27c2 of the front pair of barrier blades 27c and the lower rear barrier blade 27d2 of the rear pair of barrier blades 27d are pivoted at the other pivot 27g (the left pivot 27g as viewed in FIG. 13). Each of the rear pair of barrier blades 27d is constantly biased to rotate in a direction to close the photographic aperture 27a of the panel 27b by the corresponding torsion spring 27e whose coil portion is fitted on the corresponding engaging pin 27n. Each of the rear pair of barrier blades 27d is provided in the vicinity of the pivoted portion thereof with a driven pin 27h that is driven to open the corresponding rear barrier blade 27d against the spring force of the corresponding torsion spring 27e. Each of the front pair of barrier blades 27c is provided on an outer edge thereof with an engaging projection 27i which extends rearward to be engaged with the outer edge of the corresponding rear barrier blade 27d so that the engaging projection 27i of each of the front pair of barrier blades 27c comes into engagement with the outer edge of the corresponding rear barrier blade 27d to rotate the corresponding front barrier blade 27c in the direction to open the photographic aperture 27a together with the corresponding rear barrier blade 27d when the corresponding rear barrier blade 27d is driven to rotate in the direction to open the photographic aperture 27a. The upper front barrier blade 27c1 is provided on a rear surface thereof with an engaging projection 27j, while the upper rear barrier blade 27d1 is provided on a front surface thereof with an engaging projection 27k (see FIGS. 15A, 15B and 15C). When the upper rear barrier blade 27d1 is driven to rotate in the direction to close the photographic aperture 27a, the engaging projection 27k of the upper rear barrier blade 27d1 is engaged with the engaging projection 27j of the upper front barrier blade 27c1 to drive the upper front barrier blade 27c1 to rotate in the direction to close the photographic aperture 27a together with the upper rear barrier blade 27d1. Likewise, the lower front barrier blade 27c2 is provided on a rear surface thereof with an engaging projection 27j, while the lower rear barrier blade 27d2 is provided on a front surface thereof with an engaging projection 27k (see FIGS. 15A, 15B and 15C). When the lower rear barrier blade 27d2 is driven to rotate in the direction to close the photographic aperture 27a, the engaging projection 27k of the lower rear barrier blade 27d2 is engaged with the engaging projection 27j of the lower front barrier blade 27c2 to drive the lower front barrier blade 27c2 to rotate in the direction to close the photographic aperture 27a together with the lower rear barrier blade 27d2.

The pressure plate 27f is provided with two slots 27m through which the two drive pins 27h of the rear pair of barrier blades 27d penetrate toward the barrier drive ring 26, respectively.

Figure 16:
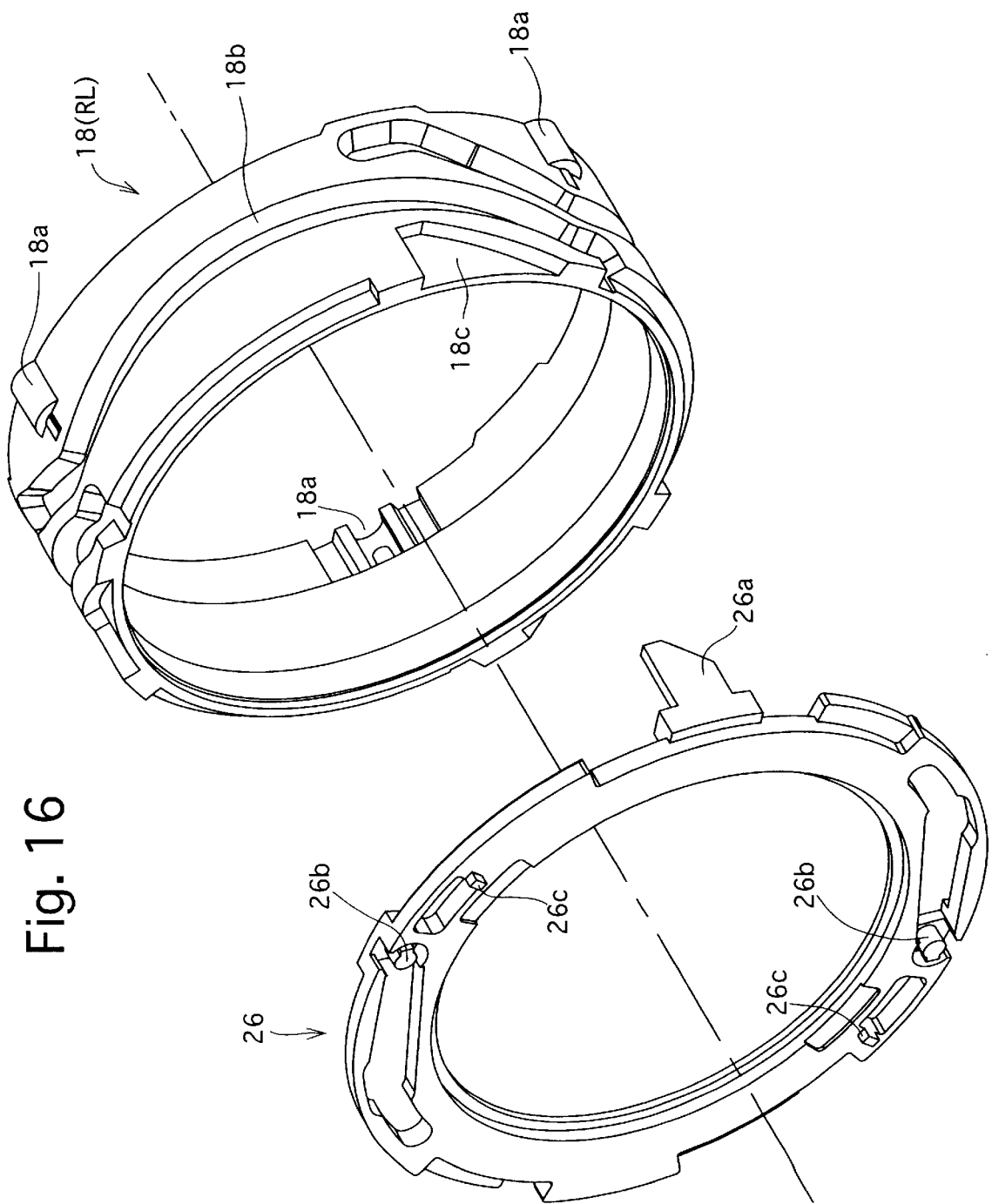
FIG. 16 is a perspective view of the second cam barrel and the barrier drive ring, showing the positional relationship between a driven lever which extends from the barrier drive ring and a rotation transfer recess formed on the second cam barrel.

The barrier drive ring 26 is provided on the front thereof with two protrusions 26b, while the external barrel 25 is provided in the vicinity of the front end thereof with corresponding two protrusions 25c (see FIGS. 16, 17 and 18). Two helical extension springs 28 are positioned between the external barrel 25 and the barrier drive ring 26 so that one and the other ends of one helical extension spring 28 are hooked on one of the two protrusions 26b and corresponding one of the two protrusions 25c, respectively, and one and the other ends of the other helical extension spring 28 are hooked on the other protrusion 26b and the other protrusion 25c, respectively. The spring force of each helical extension spring 28 is stronger than the spring force of each torsion spring 27e. The barrier drive ring 26 is constantly biased by the two helical extension springs 28 to rotate in the direction to open the two pairs of barrier blades 27c and 27d. The barrier drive ring 26 is provided on the front thereof with two protrusions 26c which can be respectively engaged with the two drive pins 27h of the rear pair of barrier blades 27d to open the two pairs of barrier blades 27c and 27d. When the barrier drive ring 26 is rotated to the rotational limit thereof by the spring force of the helical extension springs 28, each of the two protrusions 26c is engaged with the corresponding driven pin 27h to push the same in the direction to open the corresponding rear barrier blade 27d against the spring force of the corresponding torsion spring 27e, so that the corresponding front barrier blade 27c also opens via the engaging projection 27i thereof (see FIGS. 15A, 15B and 15C).

Figure 9:
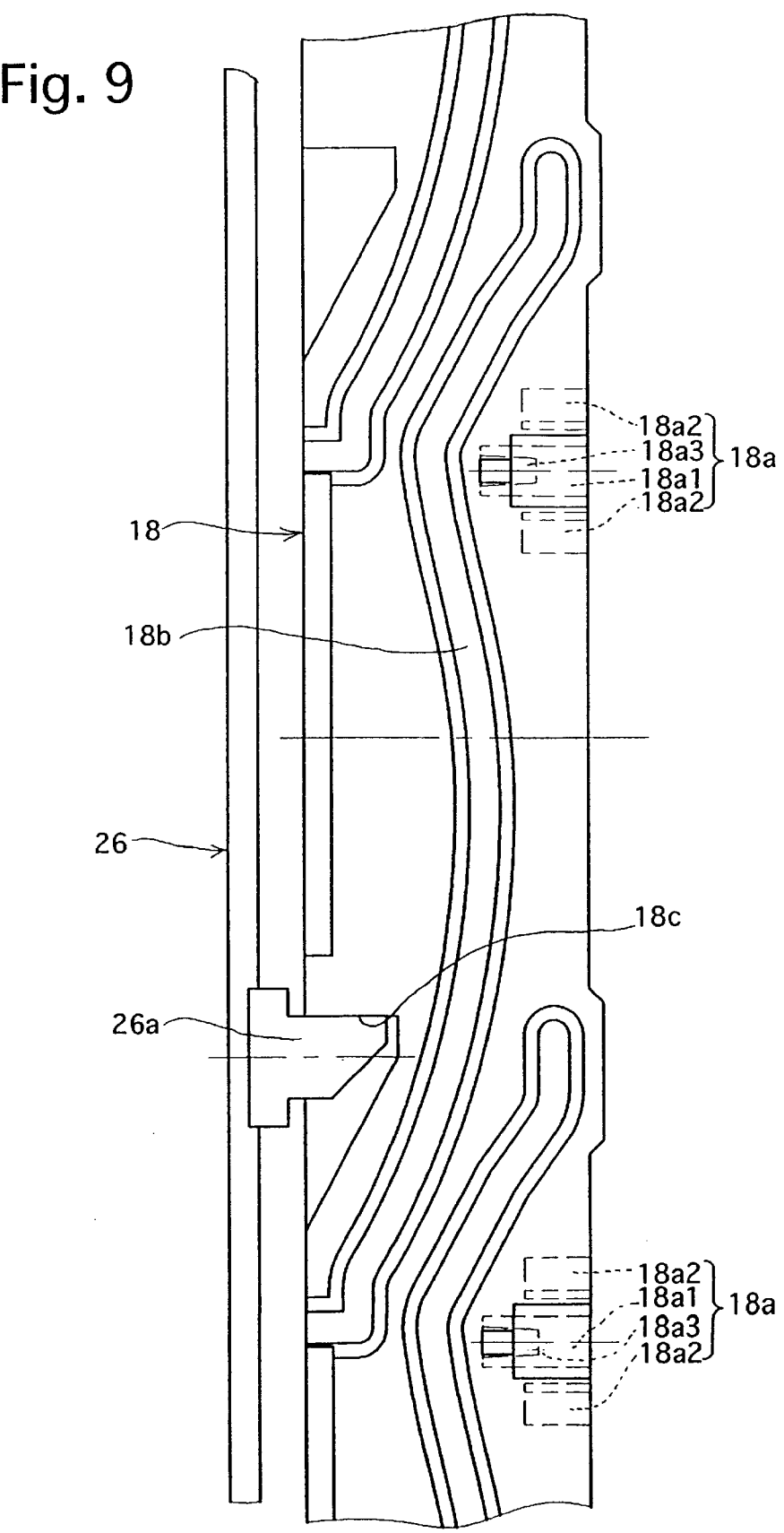
FIG. 9 is a developed view of the second cam barrel and the barrier drive ring, showing the positional relationship therebetween when the zoom lens is positioned in the accommodation position (when the power of the zoom lens is turned OFF)

On the other hand, the barrier drive ring 26 is provided with a driven lever 26a which extends from the rim of the barrier drive ring 26 toward the second cam barrel 18 to be engaged with, and disengaged from, a rotation transfer recess 18c formed on an outer peripheral surface of the second cam barrel 18 (see FIGS. 8, 9 and 16). Since the barrier drive ring 26 is supported by the external barrel 25 to be rotatable about the optical axis O relative to the external barrel 25, but immovable in the optical axis direction relative to the external barrel 25, the barrier drive ring 26 moves toward and away from the rotating second cam barrel 18 if the external barrel 25 linearly moves in the optical axis direction due to the engagement of the inward pins 25b of the external barrel 25 with the guide grooves 18b of the second cam barrel 18 as can be seen in FIGS. 8 and 9. The driven lever 26a and the rotation transfer recess 18c are apart from each other when positioned within a photographing range (i.e., between the telephoto extremity and the wide-angle extremity) as shown in FIG. 8. When the zoom barrel retreats from the telephoto extremity thereof to the accommodation position thereof, the driven lever 26a approaches the rotation transfer recess 18c and is then engaged with the rotation transfer recess 18c to apply a force to the barrier drive ring 26 to rotate the same in the direction to close the two pairs of barrier blades 27c and 27d. When the barrier drive ring 26 rotates to the rotational limit thereof against the spring force of the helical extension springs 28, each of the protrusions 26c of the barrier drive ring 26 disengages from the drive pins 27h of the corresponding rear barrier blade 27d. As a result, each of the rear pair of barrier blades 27d closes by the spring force of the corresponding torsion spring 27e, so that each of the front pair of barrier blades 27c also closes via the corresponding engaging projections 27j and 27k to thereby close the photographic aperture 27a (see FIG. 14). Conversely, when the zoom barrel advances from the accommodation position thereof to the telephoto extremity thereof, the driven lever 26a moves forwards and then disengages from the rotation transfer recess 18c to thereby allow the barrier drive ring 26 to rotate in the direction to open the two pairs of barrier blades 27c and 27d by the spring force of the helical extension springs 28. As a result, each of the protrusions 26c of the barrier drive ring 26 is engaged with the drive pin 27h of the corresponding rear barrier blade 27d to push the same in the direction to open the corresponding front barrier blade 27c via the corresponding engaging projection 27i to thereby open the two pairs of barrier blades 27c and 27d. Accordingly, as can be understood by the above description, the two pairs of barrier blades 27c and 27d are driven to open and close by rotation of the barrier drive ring 26. It should be noted that the barrier drive ring 26 has only one driven lever 26a, whereas the second cam barrel 18 has three rotation transfer recesses 18c formed at 120° intervals about the axis of the second cam barrel 18. One rotation transfer recess 18c which is actually used is freely selected from the three rotation transfer recesses 18c during assembly.

Figure 10:
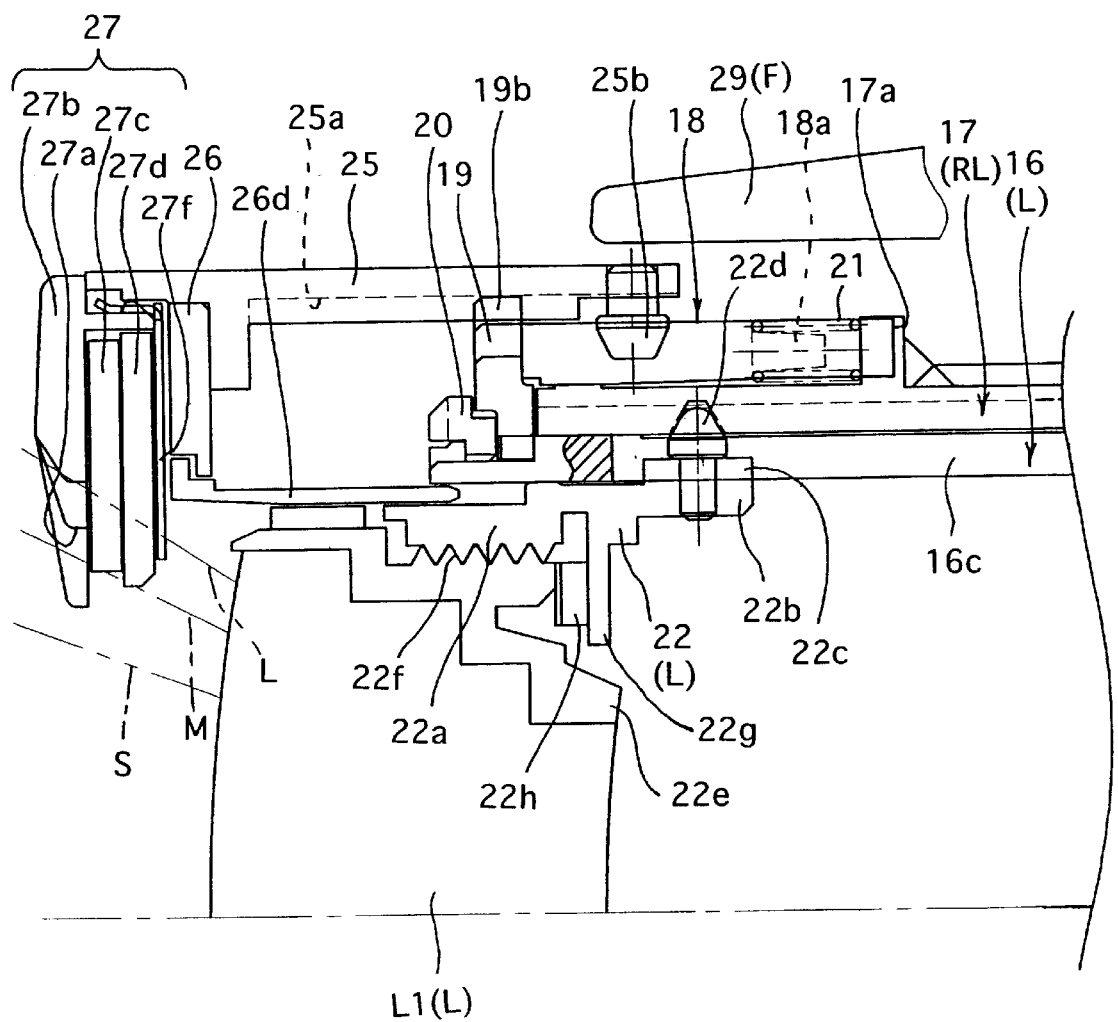
FIG. 10 is an axial cross sectional view of the zoom lens show in FIG. 1, showing the zoom lens above the optical axis thereof, showing the positional relationship between an external barrel and the second cam barrel (a first lens group) when the zoom lens is set at the wide-angle extremity thereof.
Figure 11:
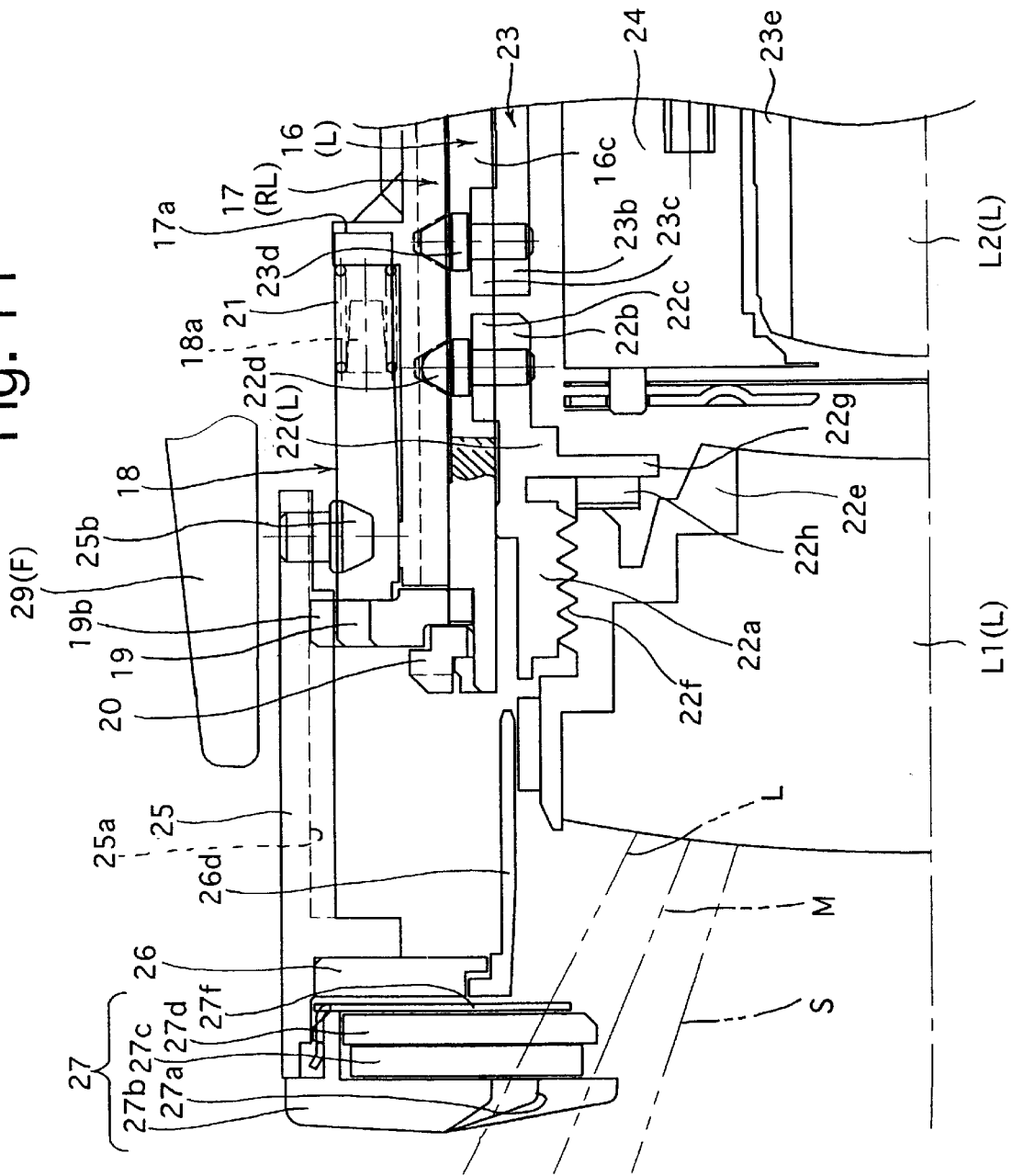
FIG. 11 is an axial cross sectional view of the zoom lens show in FIG. 1, showing the zoom lens above the optical axis thereof, and showing the positional relationship between the external barrel and the second cam barrel (the first lens group) when the zoom lens is set at the telephoto extremity thereof.
Figure 12:
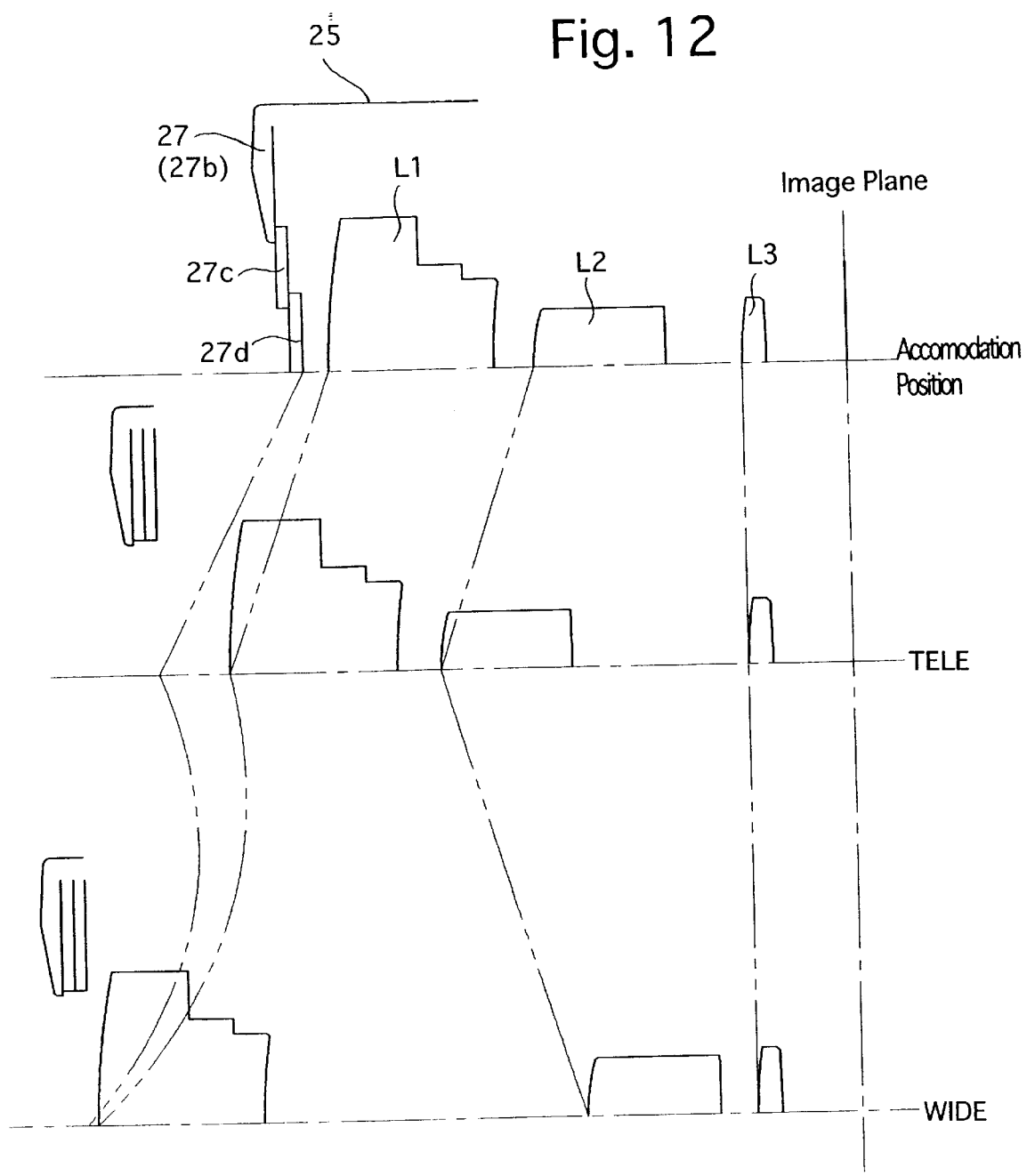
FIG. 12 is an explanatory view showing variations in axial position of the sensitive surface (image plane) of a CCD, the first lens group, a second lens group, and a barrier block when the zoom lens is driven from the accommodation position to the telephoto extremity and thereafter to the wide-angle extremity.

The external barrel 25 that is guided in the optical axis direction moves forward and rearward in the optical axis direction by rotation of the second cam barrel 18 in the above described manner. On the other hand, the first and second lens groups L1 and L2 move forward and rearward in the optical axis direction by rotation of the first cam barrel 17. FIG. 12 shows the axial position of the sensitive surface (image plane) of the CCD 12a on which subject images are formed through the photographic optical system, and the variations in the axial positions of the first lens group L1 (the principal point of the first lens group L1), the second lens group L2 (the principal point of the first lens group L2), and the barrier block 27 fixed to the front end of the external barrel 25 (more specifically, the photographic aperture 27a formed on the panel 27b of the barrier block 27), when the zoom lens is driven from the accommodation position to the wide-angle extremity via the telephoto extremity. The contours of the first and second cam grooves 17C1 and 17C2 of the first cam barrel 17 and the guide grooves 18b of the second cam barrel 18 are determined so that the first lens group L1, the second lens group L2 and the barrier block 27 move in the optical axis direction to have the moving paths shown in FIG. 12. The photographic aperture 27a has a generally rectangular shape as viewed from the front of the digital camera. The angle of view in the diagonal direction of the photographic aperture 27a is greater than the angle of view in the lateral (horizontal) direction of the photographic aperture 27a, while the angle of view in the lateral direction of the photographic aperture 27a is greater than the angle of view in the longitudinal (vertical) direction of the photographic aperture 27a. In FIG. 10, an incident light ray S on the zoom lens along the angle of view in the longitudinal direction of the photographic aperture 27a, an incident light ray M on the zoom lens along the angle of view in the lateral direction of the photographic aperture 27a, and an incident light ray L on the zoom lens along the angle of view in the diagonal direction of the photographic aperture 27a are shown by two-dot chain lines.

A light shield barrel 26d which extends from the inner edge of the barrier drive ring 26 to the front end of the outer peripheral surface of the first lens frame 22 is adhered to the inner edge of the barrier drive ring 26 by an adhesive. The light shield barrel 26d is rotationally symmetrical about the optical axis O, so that the shielding characteristics of the light shield barrel 26d do not vary even if the light shield barrel 26d rotates forwardly and reversely together with the barrier drive ring 26 about the optical axis O.

Almost all the above mentioned elements of the zoom lens except for each spring, the feed screw 10e, the set screws 23f, the follower pins 22d, the follower pins 23d, the shutter block 24, the radially inward pins 25b, the flexible coding plate 14 and the brush 15 are made of synthetic resin. Although each lens element of the first, second and third lens groups L1, L2 and L3 can be made of a plastic, at least the frontmost lens element is preferably a glass lens for the purpose of preventing the front surface of the first lens group L1 from being scratched.

In the above illustrated embodiment, although the third lens group L3 functions as focusing lens group, the zoom lens can be modified so that the first lens group L1 or the second lens group L2 functions as focusing lens group. In the case where the second lens group L2 functions as focusing lens group, the shutter block can be modified to have an auto-focusing function. Such a shutter block is well-known in the art.

As has been described above, in the present embodiment of the zoom lens, rotating the rotational barrel 13 about the optical axis O via the gear 13b causes the rotational barrel 13 to move in the optical axis direction while rotating about the optical axis O due to the engagement of the fine female thread 13a with the fine male thread 11a. At the same time, the rotation of the rotational barrel 13 is transmitted to the first cam barrel 17 due to the engagement of the inward projections 13c with the rotation transmission grooves 17c, so that the first cam barrel 17 rotates about the optical axis O. At this time, the first cam barrel 17 also moves in the optical axis direction O due to the engagement of the male helicoid 17b with the female helicoid 11b. This movement of the first cam barrel 17 causes the first and second lens frames 22 and 23, which hold the first and second lens groups L1 and L2, to move in the optical axis direction in accordance with the first and second cam grooves 17C1 and 17C2, respectively, to perform a zooming operation.

In this zooming operation, rotation is transmitted to the first cam barrel 17 from the rotational barrel 13 via the three inward projections 13c of the rotational barrel 13, which are respectively engaged with the three rotation transmission grooves 17c of the first cam barrel 17. When the first cam barrel 17 moves forward and rearward in the optical axis direction while rotating about the optical axis O, the position of engagement of each of the three inward projections 13c with respect to the associated rotation transmission groove 17c varies. More specifically, the more the first cam barrel 17 is extended forward from the stationary barrel 11 in the optical axis direction, the more the inward projections 13c move toward the rear ends of the rotation transmission grooves 17c so that each inward projection 13c is engaged in the associated rotation transmission groove 17c at a position closer to the rear end thereof. The linear guide barrel 16, which moves together with the first cam barrel 17 in the optical axis direction, is guided linearly in the optical axis direction by the engagement of the three linear guide projections 16b with the three linear guide grooves 11c, so that the position of engagement of each of the three linear guide projections 16b with respect to the associated linear guide groove 11c in the optical axis direction varies when the linear guide barrel 16 moves forward and rearward in the optical axis direction. More specifically, the more the linear guide barrel 16 is extended forward from the stationary barrel 11 in the optical axis direction, the more the linear guide projections 16b move toward the front end of the stationary barrel 11 so that each linear guide projection 16b is engaged in the associated linear guide groove 11c at a position closer to the front end thereof. Accordingly, the linear guide grooves 11c of the stationary barrel 11, in which the linear guide projections 16b are engaged when the zoom lens is in use (e.g., during a zooming operation of the zoom lens), are formed as linear grooves extending parallel to the optical axis O, as shown in FIGS. 1 and 21A through 21D. Likewise, the rotation transmission grooves 17c of the first cam barrel 17, in which the inward projections 13c are engaged when the zoom lens is in use (e.g., during a zooming operation of the zoom lens), are also formed as linear grooves extending parallel to the optical axis O, as shown in FIGS. 1 and 21A through 21D.

The introducing grooves 11d are formed on the inner peripheral surface of the stationary barrel 11, in front of the linear guide grooves 11c in the optical axis direction, so that a major part of each introducing groove lid extends parallel to threads of the female helicoid 11b, so that one end of each introducing groove lid opens at the front end of the stationary barrel 11, and so that the other end of each introducing groove 11d is connected with the corresponding linear guide groove 11c. Likewise, the introducing grooves 17d are formed on the outer peripheral surface of the first cam barrel 17, behind the rotation transmission grooves 17c in the optical axis direction, so that a major part of each introducing groove 17d extends parallel to threads of the male helicoid 17b, so that one end of each introducing groove 17d opens at the rear end of the first cam barrel 17, and so that the other end of each introducing groove 17d is connected with the corresponding rotation transmission groove 17c. The frontmost part of each introducing groove lid which opens at the front end of the stationary barrel 11 is formed as a groove extending parallel to the optical axis O. Likewise, rearmost part of each introducing groove 17d which opens at the rear end of the first cam barrel 17 is formed as a groove extending parallel to the optical axis O.

Due to such structures of the linear guide barrel 16 and the first cam barrel 17, an assembly composed of the first cam barrel 17 and the linear guide barrel 16 is mounted to and dismounted from the stationary barrel 11 and the rotational barrel 13 in a manner which will be hereinafter discussed with reference to FIGS. 21A, 21B, 21C and 21D. At the same time, the states of the first and second lens frames 22 and 23 (the first and second lens groups L1 and L2) supported inside the linear guide barrel 16 when the assembly composed of the first cam barrel 17 and the linear guide barrel 16 is mounted to and dismounted from the stationary barrel 11 and the rotational barrel 13 will be discussed with reference to FIG. 3.

Figure 21A:
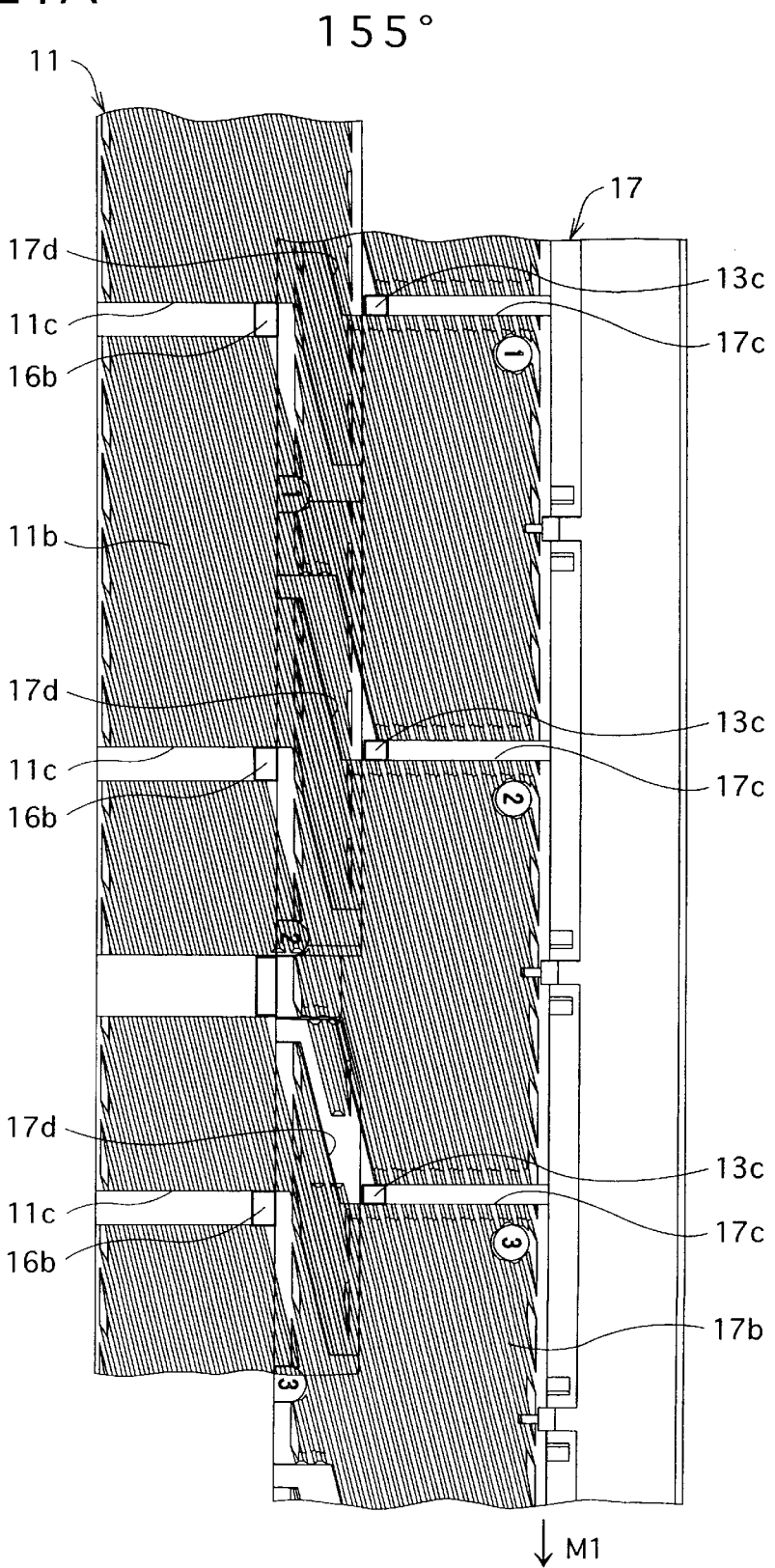
FIG. 21A is a developed view of the stationary barrel of the zoom lens and the first cam barrel, showing a state where the first cam barrel is engaged with the stationary barrel of the zoom lens via helicoidal threads.

FIG. 21A shows a state of engagement of the first cam barrel 17 with the stationary barrel 11 when each inward projection 13c of the rotational barrel 13 is engaged in the corresponding rotation transmission groove 17c in the vicinity of the front end thereof and at the same time each linear guide projection 16b of the linear guide barrel 16 is engaged in the corresponding linear guide groove 11c in the vicinity of the rear end thereof. In other words, FIG. 21A shows a state of engagement of the first cam barrel 17 with the stationary barrel 11 when the first cam barrel 17 is rotated relative to the stationary barrel 11 by a rotational angle of 155° from the accommodation position of the first cam barrel 17. In the state shown in FIG. 21A, the first cam barrel 17 is positioned in the maximum extended position (a wide-angle position or a frontmost position) in the operating range of the first cam barrel 17. At this time, each follower pin 22d of the first lens frame 22, which is supported inside the linear guide barrel 16 and the first cam barrel 17, is engaged in the corresponding first cam groove 17C1 at the wide-angle position (WIDE) thereof, while each follower pin 23d of the second lens frame 23, which is supported inside the linear guide barrel 16 and the first cam barrel 17, is engaged in the corresponding second cam groove 17C2 at the wide-angle position (WIDE) thereof.

Figure 21B:
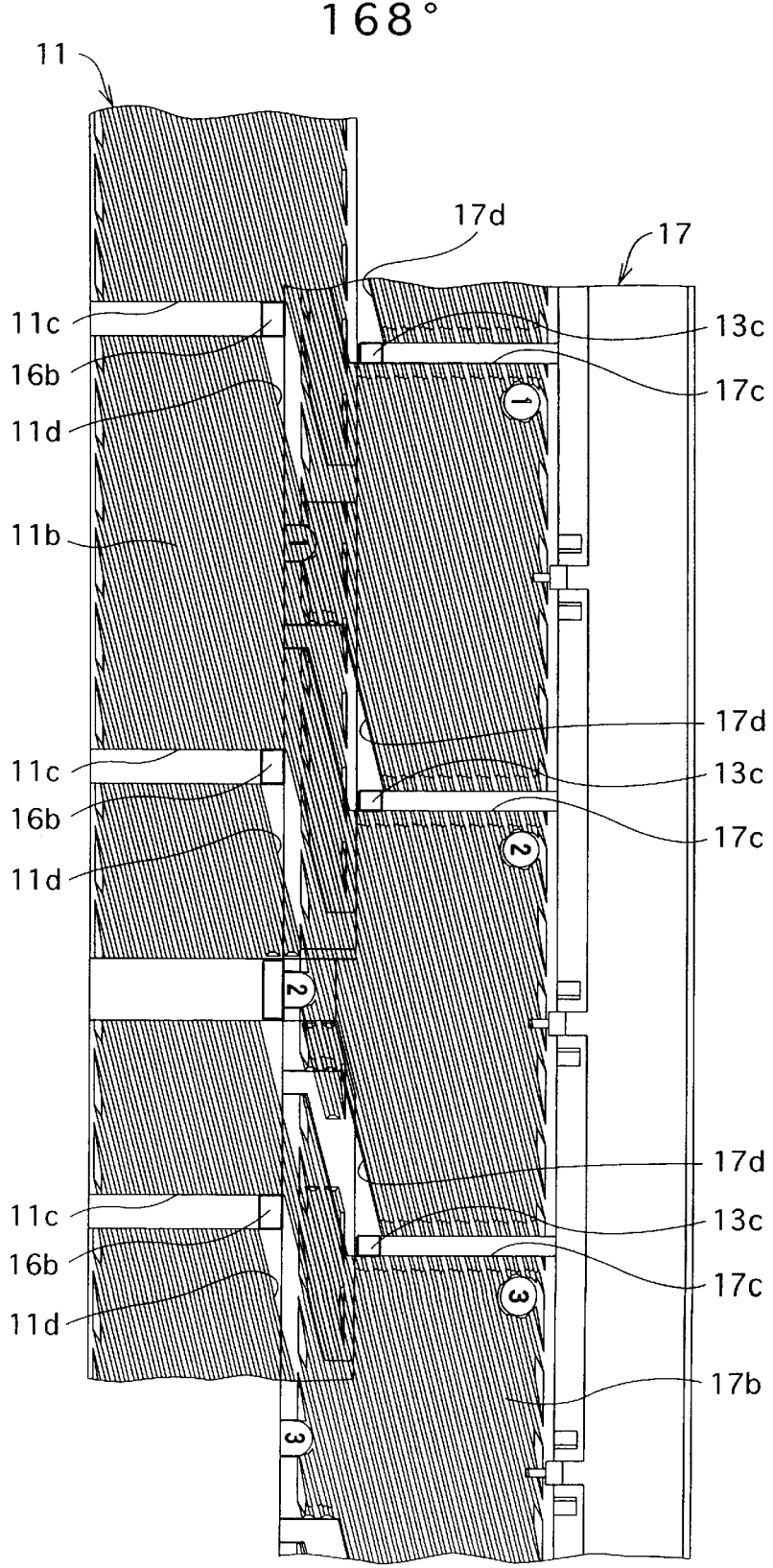
FIG. 21B is a view similar to that of FIG. 21A and illustrates a state where the first cam barrel is engaged with the stationary barrel of the zoom lens via helicoidal threads by a different amount of engagement.

Rotating the assembly composed of the first cam barrel 17 and the linear guide barrel 16 in an advancing direction (a direction indicated by an arrow M1 shown in FIG. 21A) from the wide-angle position (the maximum extended position) causes the first cam barrel 17 to move forward in the optical axis direction while rotating about the optical axis O in accordance with the engagement of the male helicoid 17b with the female helicoid 11b. Since the linear guide projections 16b are respectively engaged in the linear guide grooves 11c to guide the linear guide barrel 16 linearly in the optical axis direction when the linear guide barrel 16 is in the wide-angle position, the linear guide barrel 16 moves in the optical axis direction together with the first cam barrel 17 without rotating about the optical axis O if the first cam barrel 17 moves in the optical axis direction while rotating about the optical axis O. As a result, each linear guide projection 16b of the linear guide barrel 16 reaches the border between the associated linear guide groove 11c and the associated introducing groove 11d and at the same time each the inward projection 13c of the rotational barrel 13 reaches the border between the associated rotation transmission groove 17c and the associated introducing groove 17d. The state of engagement of the first cam barrel 17 with the stationary barrel 11 at this time is shown in FIG. 21B, wherein the first cam barrel 17 is rotated relative to the stationary barrel 11 by a rotational angle of 168° from the accommodation position of the first cam barrel 17 in the illustrated embodiment. At this time, each follower pin 22d of the first lens frame 22 has moved to a position in the vicinity of an assembling position (or a disassembling position) Q (see FIG. 3) in the associated first cam groove 17C1. Likewise, each follower pin 23d of the second lens frame 23 has moved to a position in the vicinity of the disassembling position Q in the associated second cam groove 17C2. The first cam barrel 17 can be moved from the accommodation position thereof, wherein the amount of overlap between the first cam barrel 17 and the stationary barrel 11 in the optical axis direction is maximum, to the position shown in FIG. 21B slightly in front of the wide-angle position of the first cam barrel 17, by rotating the rotational barrel 13 about the optical axis O relative to the stationary barrel 11.

Further rotating the assembly composed of the first cam barrel 17 and the linear guide barrel 16 in the advancing direction from the position shown in FIG. 21B causes the first cam barrel 17 to further move forward in the optical axis direction while rotating about the optical axis O in accordance with the engagement of the male helicoid 17b with the female helicoid 11b. At this time, since each inward projection 13c moves in the associated introducing groove 17d, whose major part is formed to extend parallel to the threads of the male helicoid 17b, the rotational barrel 13 does not rotate together with the first cam barrel 17 about the optical axis O. On the other hand, the linear guide barrel 16 is no longer guided in the optical axis direction by the stationary barrel 11 since each linear guide projection 16b moves in the associated introducing groove 11d, whose major part is formed to extend parallel to threads of the female helicoid 11b, so that the linear guide barrel 16 is moved forward in the optical axis direction while rotating about the optical axis O together with the first cam barrel 17. Namely, when the assembly composed of the first cam barrel 17 and the linear guide barrel 16 is rotated in the advancing direction from the position shown in FIG. 21B, no rotation is transmitted between the first cam barrel 17 and the rotational barrel 13, and at the same time the assembly composed of the first cam barrel 17 and the linear guide barrel 16 moves forward in the optical axis direction from the stationary barrel 11 while rotating about the optical axis O with no relative rotation between the first cam barrel 17 and the linear guide barrel 16. Since the first cam barrel 17 and the linear guide barrel 16 do not rotate relative to each other at this time, neither the first lens frame 22 nor the second lens frame 23 moves in the optical axis direction in the first cam barrel 17.

Figure 20:
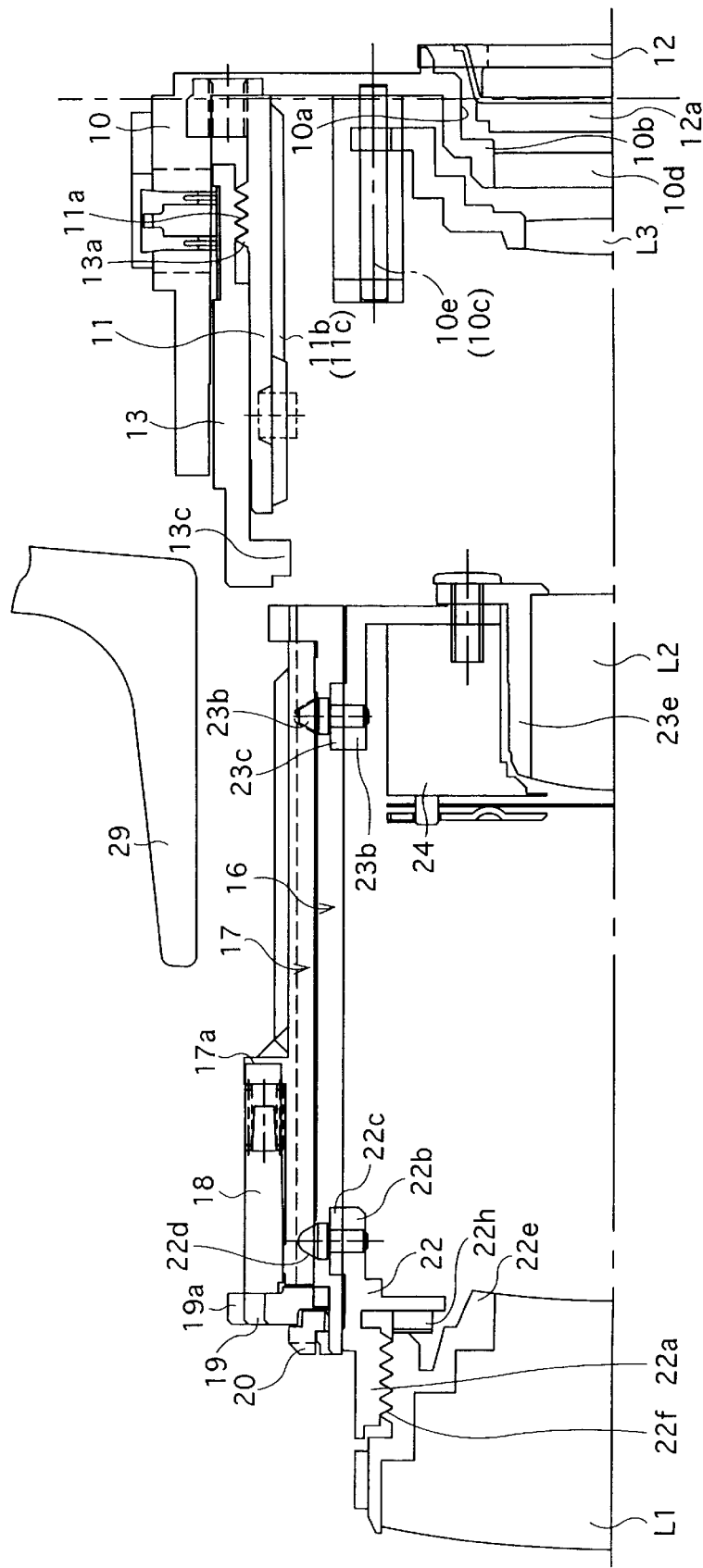
FIG. 20 is an axial cross sectional view of the zoom lens shown in FIG. 1, showing the zoom lens above the optical axis thereof, and showing a state where an assembly, composed of the first and second cam barrels and the linear guide barrel, is dismounted from the zoom lens after the barrier block is dismounted from the zoom lens.
Figure 21C:
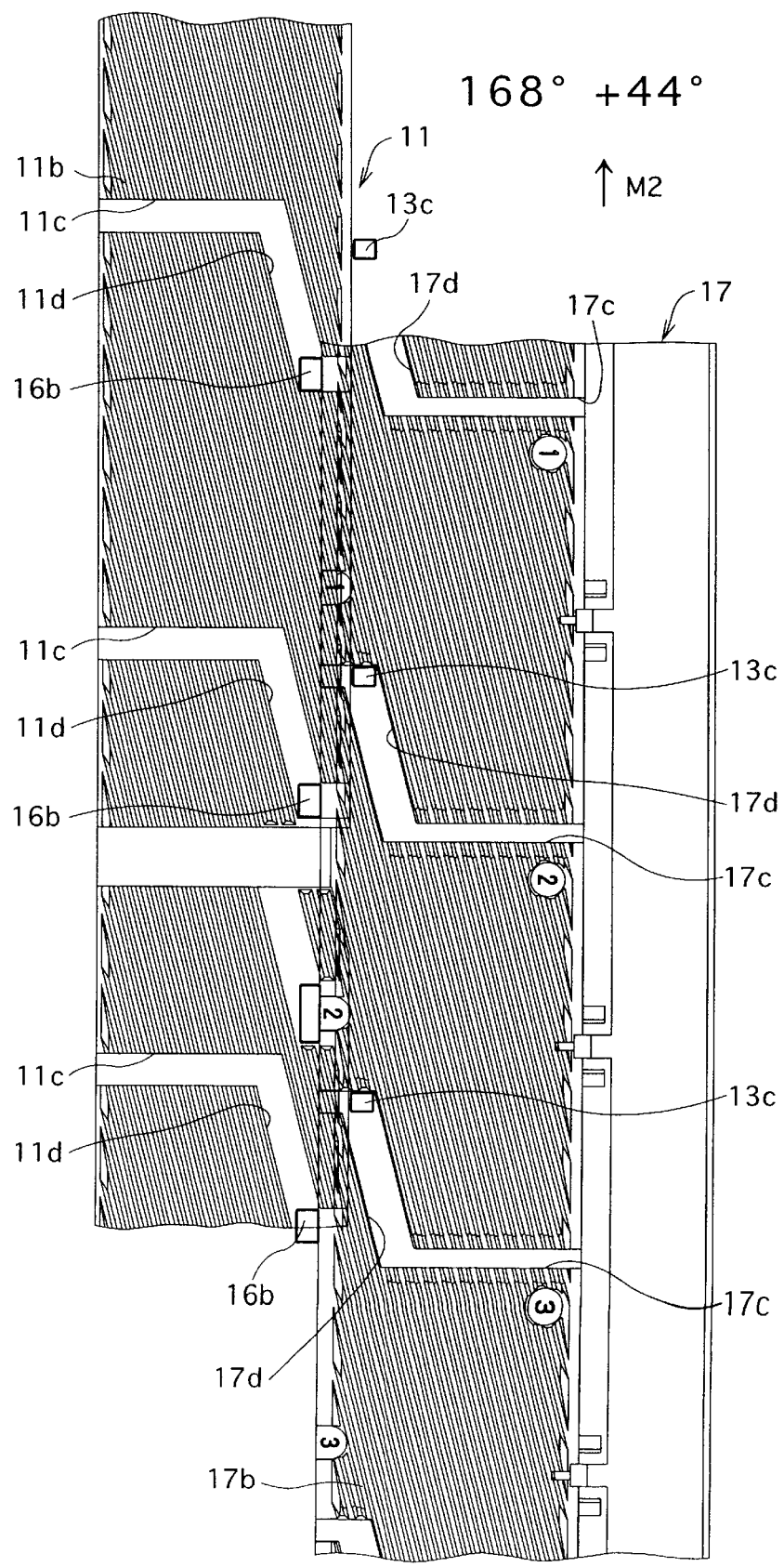
FIG. 21C is a view similar to that of FIGS. 21A and 21B and illustrates a state where the first cam barrel is engaged with the stationary barrel of the zoom lens via helicoidal threads by a different amount of engagement.
Figure 21D:
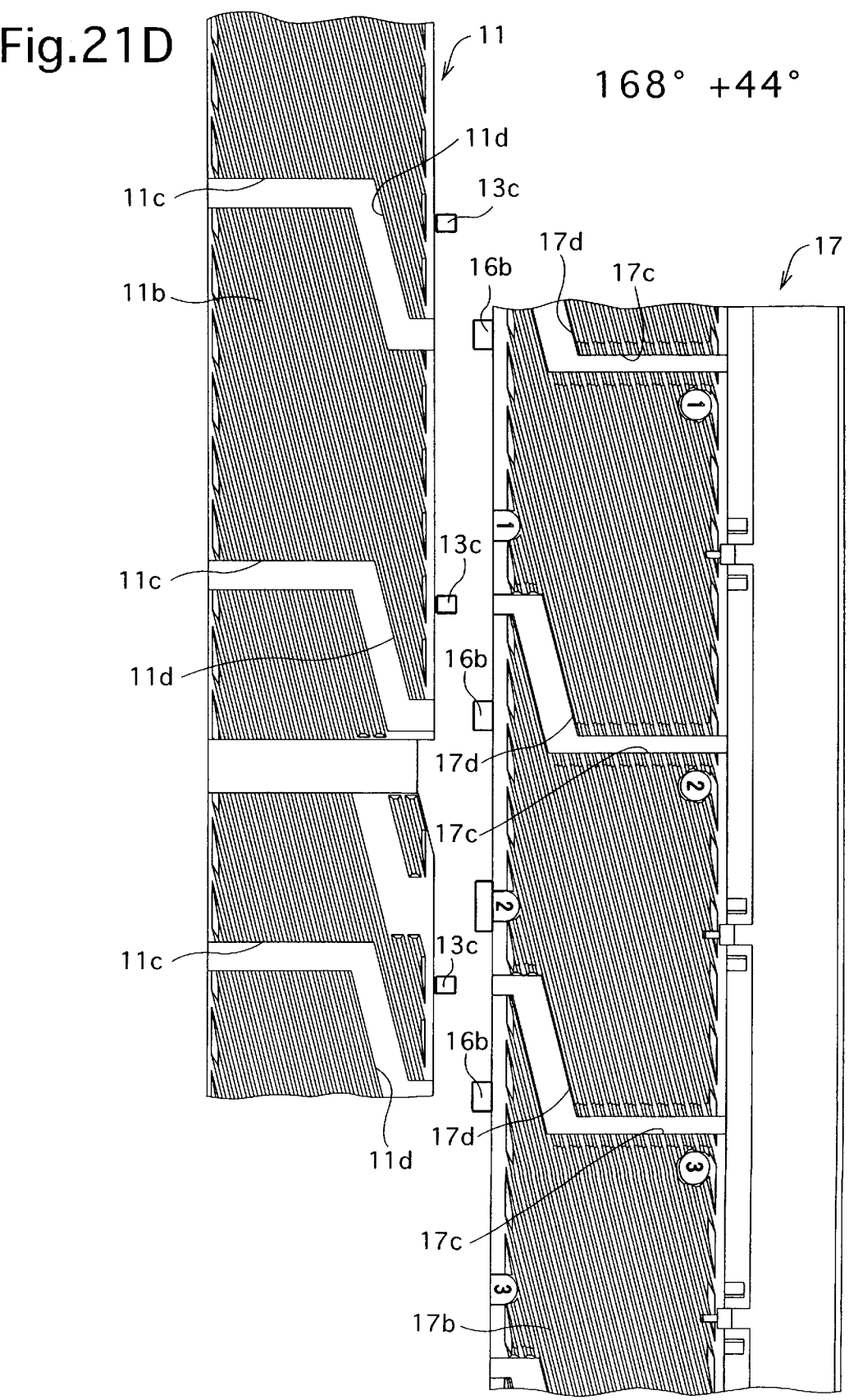
FIG. 21D is a developed view of the stationary barrel of the zoom lens and the first cam barrel, showing a state where the first cam barrel is dismounted from the stationary barrel of the zoom lens.

If the assembly composed of the first cam barrel 17 and the linear guide barrel 16 is further rotated relative to the stationary barrel 11 in the advancing direction from the position shown in FIG. 21B by a predetermined rotational angle (a rotational angle of 44° in the illustrated embodiment), the first cam barrel 17 is engaged with the stationary barrel 11 in a state shown in FIG. 21C. In this state, each inward projection 13c is engaged in the associated introducing groove 17d at a position therein in the vicinity of the rear end thereof which opens at the rear end of the first cam barrel 17, and at the same time, each linear guide projection 16b is engaged in the associated introducing groove lid at a position in the vicinity of the front end thereof which opens at the front end of the stationary barrel 11. Hence, the first cam barrel 17 and the stationary barrel 11 do not substantially overlap each other in the optical axis direction, so that the male helicoid 17b and the female helicoid 11b are no longer in mesh with each other. Therefore, in the state shown in FIG. 21C, the assembly composed of the first cam barrel 17 and the linear guide barrel 16 can be dismounted from the stationary barrel 11 and the rotational barrel 13 by moving the assembly forward from the stationary barrel 11 and the rotational barrel 13. FIG. 21D shows a state where the assembly composed of the first cam barrel 17 and the linear guide barrel 16 is dismounted from the stationary barrel 11 and the rotational barrel 13. FIG. 20 also shows this state in cross section.

Although the first cam barrel 17 and the linear guide barrel 16 rotate together about the optical axis O with no relative rotation therebetween when the assembly composed of the first cam barrel 17 and the linear guide barrel 16 is rotated relative to the stationary barrel 11 from the position shown in FIG. 21B to the position shown in FIG. 21C, the first cam barrel 17 and the linear guide barrel 16 slightly rotate relative to each other about the optical axis O when the assembly composed of the first cam barrel 17 and the linear guide barrel 16 is rotated relative to the stationary barrel 11 from the position shown in FIG. 21C to the position shown in FIG. 21D since frontmost part of each introducing groove lid and rearmost part of each introducing groove 17d are each formed as a groove extending parallel to the optical axis o as noted above. In the present embodiment of the zoom lens, at the moment the assembly composed of the first cam barrel 17 and the linear guide barrel 16 has been rotated relative to the stationary barrel 11 from the position shown in FIG. 21B to the position shown in FIG. 21C, each of the follower pins 22d and 23d stays in the associated first or second cam groove 17C1 or 17C2 between the wide-angle position thereof and the disassembling position Q thereof. Subsequently, if the first cam barrel 17 and the linear guide barrel 16 are again rotated relative to each other about the optical axis O when the assembly composed of the first cam barrel 17 and the linear guide barrel 16 is in the position shown in FIG. 21C, each of the follower pins 22d and 23d is moved in the associated first or second cam groove 17C1 or 17C2 to the disassembling position Q thereof in accordance with rotation of the first cam barrel 17 in the advancing direction thereof.

If the assembly composed of the first cam barrel 17 and the linear guide barrel 16 is dismounted from the stationary barrel 11 in the above described manner, the first and second lens frames 22 and 23 can be removed from the rear of the assembly of the first cam barrel 17 and the linear guide barrel 16. In a state of the assembly composed of the first cam barrel 17 and the linear guide barrel 16 at the time the assembly is dismounted from the stationary barrel 11, the rear ends of the three second cam grooves 17C2 are respectively positioned at the same positions as the rear ends of the linear guide slots 16c in a circumferential direction about the optical axis O. on the other hand, the three square projections 23c, which are respectively engaged in the three linear guide slots 16c, and the follower pins 23d are formed at the same positions in a circumferential direction about the optical axis O. Therefore, each of the three follower pins 23d that respectively penetrate through the three linear guide slots 16c is positioned in the associated second cam groove 17C2 in the vicinity of the rear end opening thereof (i.e., in the vicinity of the disassembling position Q), while each of the three square projections 23c is positioned in the associated linear guide slot 16c in the vicinity of the rear end opening thereof. Accordingly, the second lens frame 23 can be dismounted from the assembly composed of the first cam barrel 17 and the linear guide barrel 16 by simply pulling out the second lens frame 23 from the rear of the assembly. Subsequently, if the first cam barrel 17 and the linear guide barrel 16 are rotated relative to each other so that each follower pin 22d positioned in the associated first cam groove 17C1 at the rear end thereof (at the disassembling position Q) moves to the rear end opening of the associated first cam groove 17C1, the first lens frame 22 can also be dismounted from the rear of the stationary barrel 11.

Each second cam groove 17C2 is provided in the vicinity of the rear end opening thereof with a stop section N which serves as a stop for preventing the associated follower pin 23d from moving toward the rear end opening of the second cam groove 17C2 beyond the stop. The depth of the stop section N in a radial direction of the first cam barrel 17 is smaller than that of the zooming section of the second cam groove 17C2. When one follower pin 23d is fitted in the associated second cam groove 17C2, at least in the zooming section thereof, a constant force is exerted upon the follower pin 23d radially outwards so that the follower pin 23d is fitted in the associated second cam groove 17C2 without play. Such a constant force is exerted upon the follower pin 23d via a resilient deformation of the associated resilient extending piece 23b inwards in a radial direction when the follower pin 23d is fitted in the associated second cam groove 17C2, at least in the zooming section thereof. When the follower pin 23d passes the stop section N, whose depth is smaller than that of the zooming section of the second cam groove 17C2 in the radial direction of the first cam barrel 17, a frictional resistance between the follower pin 23d and the second cam groove 17C2 increases since the amount of the resilient deformation of the associated resilient extending piece 23b increases inwards in the radial direction. Therefore, when the follower pin 23d is in the second cam groove 17C2 on the dead end side thereof beyond the stop section N, the stop section N prevents the follower pin 23d from moving rearward accidentally, toward the rear end opening of the second cam groove 17C2 beyond the stop section N. If the second lens frame 23 does not come off the linear guide barrel 16 and the first cam barrel 17, the first lens frame 22, which is positioned in front of the second lens group 23 and which uses the three linear guide grooves 16 together with the second lens frame 23, does not come off the linear guide barrel 16 and the first cam barrel 17 either. When the second lens frame 23 is removed from the assembly of the first cam barrel 17 and the linear guide barrel 16, each follower pin 23d only needs to be moved to the rear end opening of the second cam groove 17C2 beyond the stop section N while each resilient extending piece 23b is deformed inwards in the radial direction a little further after each follower pin 23d reaches the stop section N.

An operation of mounting the assembly composed of the first cam barrel 17 and the linear guide barrel 16 to the stationary barrel 11 and the rotational barrel 13 is the reverse of the above described operation of dismounting the assembly composed of the first cam barrel 17 and the linear guide barrel 16 from the stationary barrel 11 and the rotational barrel 13. Therefore, firstly, the assembly composed of first cam barrel 17 and the linear guide barrel 16 is held to have a relative rotational position therebetween so that the follower pins 22d and 23d of the first and second lens frames 22 and 23 are respectively positioned in the first and second cam grooves 17C1 and 17C2 at the disassembling positions Q thereof, and subsequently, the assembly composed of the first cam barrel 17 and the linear guide barrel 16 is moved rearward, toward the stationary barrel 11 and the rotational barrel 13, in the optical axis direction with the linear guide projections 16b and the inward projections 13c being aligned with the openings of the introducing grooves 11d and 17d, respectively. As a result, the state shown in FIG. 21C is obtained. Subsequently, the assembly composed of the first cam barrel 17 and the linear guide barrel 16 is rotated in a direction (retracting direction) indicated by an arrow M2 shown in FIG. 21C so as to have the state shown in FIG. 21B. When the assembly composed of the first cam barrel 17 and the linear guide barrel 16 is rotated relative to the stationary barrel 11 from the position shown in FIG. 21C to the position shown in FIG. 21B, the first cam barrel 17 and the linear guide barrel 16 rotate together about the optical axis O without rotating relative to each other about the optical axis O, while the rotational barrel 13 does not rotate about the optical axis O relative to the stationary barrel 11, as described above. After the state shown in FIG. 21B is obtained, if the first cam barrel 17 is further rotated in the retracting direction, the first cam barrel 17 and the linear guide barrel 16 move rearward in the optical axis direction while rotating relative to each other about the optical axis O to obtain the wide-angle position shown in FIG. 21A. The first cam barrel 17 in the state shown in FIG. 21B can be rotated in the retracting direction by rotating the rotational barrel 13.

In the present embodiment of the zoom lens having the above described structure, a sufficient amount of engagement between the male and female helicoids 17b and 11b in the optical axis direction is ensured even when the first cam barrel 17 is in the wide-angle position (i.e., the maximum extended position) in the operating range as shown in FIG. 21A, without forming each of the rotation transmission grooves 17c and the linear guide grooves 11c to extend up to a position immediately before a position of disengagement of the male and female helicoids 17b and 11b in the optical axis direction. Namely, since the introducing grooves 11d, which have no influence on the guiding mechanism for guiding the first and second lens groups L1 and L2 in the optical axis direction or the rotation transmission mechanism for transmitting rotation to the first cam barrel 17, are formed on the stationary barrel 11 in an area in front of the front end of an operating area of the female helicoids 11b which is used during operation of the zoom lens after assembly; and furthermore since the introducing grooves 17d, which also have no influence on the aforementioned guiding mechanism or the aforementioned rotation transmission mechanism, are formed on the first cam barrel 17 in an area behind the rear end of an operating area of the male helicoids 17b which is used during operation of the zoom lens after assembly, at least the areas of the male and female helicoids 17b and 11b on which the introducing grooves 11d and 17d are formed overlap each other in the optical axis direction. Due to this structure, when the first cam barrel 17 is in the operating range which includes the zooming range, sufficient strength between the first cam barrel 17 and the stationary barrel 11 for supporting the first cam barrel 17 by the stationary barrel 11 is ensured at all times to thereby minimize a possibility of the first and second lens groups L1 and L2, supported inside the first cam barrel 17, being eccentric and/or tilting with respect to the optical axis O, and/or deviating in the optical axis direction. Although problems with deterioration of optical performance of the zoom lens due to eccentricity or tilt of a lens group or groups with respect to the optical axis often occur in digital cameras such as utilized in the present embodiment, such a deterioration of the optical performance does not easily occur according to the present embodiment of the zoom lens.

Furthermore, if the amount of engagement between the male and female helicoids 17b and 11b in the optical axis direction is great, unwanted light cannot easily enter into the zoom lens from a gap between the first cam barrel 17 and the stationary barrel 11 to thereby prevent unwanted light from entering into the CCD 12a from the outside of the photographic optical path. Therefore, a light shield structure does not have to be provided between the first cam barrel 17 and the stationary barrel 11. Moreover, each of the linear guide grooves 11c is not formed so as to make the front and rear ends of the stationary barrel 11 connect with each other in a straight line in the optical axis direction via the linear guide groove 11c since the introducing grooves 11d, which extend so as to be inclined to the optical axis O, are formed continuously with the linear guide grooves 11c. Likewise, each of the rotation transmission grooves 17c is not formed so as to make the front and rear ends of the first cam barrel 17 connect with each other in a straight line in the optical axis direction via the rotation transmission groove 17c since the introducing grooves 17d, which extend inclined to the optical axis O, are formed continuously with the rotation transmission grooves 17c. Accordingly, unwanted light cannot easily enter the zoom lens between the stationary barrel 11 and the first cam barrel 17 in a direction toward the back of the stationary barrel 11 via the linear guide grooves 11c or the rotation transmission grooves 17c.

When the assembly composed of the first cam barrel 17 and the linear guide barrel 16 is rotated to move forward from the wide-angle position (the maximum extended position shown in FIG. 21A) in an assembled state of the zoom lens to dismount the assembly from the stationary barrel 11 and the rotational barrel 13, the assembly composed of the first cam barrel 17 and the linear guide barrel 16 can be dismounted from the stationary barrel 11 and the rotational barrel 13 without rotating the first cam barrel 17 and the linear guide barrel 16 relative to each other since the linear guide projections 16b of the linear guide barrel 16 move in the introducing grooves 11d that extend parallel to threads of the female helicoid 11b. If the linear guide barrel 16 and the first cam barrel 17 are rotated together when dismounted from the stationary barrel 11 and the rotational barrel 13, the linear guide barrel 16 and the first cam barrel 17 can move with less frictional resistance as compared with the case where the linear guide barrel 16 is guided linearly in the optical axis direction without rotating about the optical axis O. Therefore, the efficiency of assembling and disassembling the zoom lens does not deteriorate even if a large amount of engagement between the male and female helicoids 17b and 11b in the optical axis direction is secured when the zoom lens is in the maximum extended position (shown in FIG. 21A) to thus increase the amount of rotation of the first cam barrel 17 from the maximum extended position thereof to the disassembling position. Furthermore, if no unnecessary rotation occurs between the first cam barrel 17 and the linear guide barrel 16 during operation of mounting and dismounting the assembly, composed of the first cam barrel 17 and the linear guide barrel 16, to and from the stationary barrel 11 and the rotational barrel 13, neither the first lens frame 22 nor the second lens frame 23 unnecessarily move inside the assembly composed of the first cam barrel 17 and the linear guide barrel 16, so that the lens group guiding/supporting structure for each of the first and second lens frames 22 and 23 can be simplified. Specifically, in the present embodiment of the zoom lens, each of the first and second cam grooves 17C1 and 17C2 can be prevented from being formed excessively long or having a complicated shape between the wide-angle position (WIDE) and the disassembling position Q. This ensures sufficient strength of the first cam barrel 17.

Likewise, when the assembly composed of the first cam barrel 17 and the linear guide barrel 16 is dismounted from the stationary barrel 11 and the rotational barrel 13, the rotational barrel 13 does not rotate while the assembly composed of the first cam barrel 17 and the linear guide barrel 16 is dismounted from the stationary barrel 11 and the rotational barrel 13 since the inward projections 13c of the rotational barrel 13 move in the introducing grooves 17d that extend parallel to threads of the male helicoid 17b. This reduces the frictional resistance to the first cam barrel 17, so that the efficiency of assembling and disassembling operations of the zoom lens does not deteriorate.

Furthermore, the relative rotational position between the first cam barrel 17 and the linear guide barrel 16, when the assembly composed of the first cam barrel 17 and the linear guide barrel 16 is dismounted from the stationary barrel 11 and the rotational barrel 13, allows the second lens frame 23 to be dismounted from the assembly composed of the first cam barrel 17 and the linear guide barrel 16 by simply pulling out the second lens frame 23 from the rear of the assembly. Accordingly, the present embodiment of the zoom lens excels assembly and disassembly of the lens groups to and from the zoom lens.

The mechanism for mounting and dismounting the assembly composed of the first cam barrel 17 and the linear guide barrel 16 to and from the stationary barrel 11 and the rotational barrel 13 has been described above. This mechanism is associated with the mechanism for mounting and dismounting the external barrel 25 (which bears the barrier block 27 at the front end thereof) to and from the front of the zoom lens. The zoom lens assembling mechanism of the present embodiment of the zoom lens which makes it easy for the zoom lens to be assembled and disassembled, together with the mechanism for mounting and dismounting the external barrel 25, will be hereinafter discussed.

Each of the first and second lens groups L1 and L2 is driven forward and rearward in the optical axis direction by rotation of the first cam barrel 17 to vary the focal length, while the external barrel 25 together with the barrier block 27 is driven forward and rearward in the optical axis direction by rotation of the second cam barrel 18, which rotates together with the first cam barrel 17. The contours (profiles) of the first and second cam grooves 17C1 and 17C2 of the first cam barrel 17 and the guide grooves 18b of the second cam barrel 18 are determined so that the first lens group L1, the second lens group L2 and the barrier block 27 move in the optical axis direction to have the moving paths shown in FIG. 12.

FIG. 22 is a fragmentary developed view of the second cam barrel 18, showing an embodiment of the contour (profile) of each guide groove 18b formed on the second cam barrel 18, which is rotated together with the first cam barrel 17 about the optical axis O. Each of the three guide grooves 18b is provided with an assembling section AS which includes the aforementioned assembling position X (at which the three inward pins 25b of the external barrel 25 are respectively inserted into, or taken out of, the three guide grooves 18b of the second cam barrel 18), and an operating section U which includes a zooming section Z. One end of the assembling section AS opens at the front end of the second cam barrel 18 and the other end is connected with one end of the operating section U or the zooming section Z.

A minor part of the assembling section AS which includes the aforementioned assembling position X extends in the optical axis direction. The operating section U extends substantially along the circumference of the second cam barrel 18. The opposite ends of the zooming section Z correspond to the wide-angle position W and the telephoto position T, respectively. The wide-angle position W is closer to the assembling position X than the telephoto position T. Each of the three guide grooves 18b is further provided on the opposite end thereof with respect to the assembling position X with an accommodation position A. When the external barrel 25 is coupled to the second cam barrel 18, firstly the second cam barrel 18 is rotated relative to the external barrel 25 about the axis thereof, and then the three radially inward pins 25b of the external barrel 25 are respectively aligned at the assembling positions X of the three guide grooves 18b of the second cam barrel 18. At this stage, the three outward projections 19b of the linear guide ring 19 are respectively inserted into the three linear guide grooves 25a so as to guide the external barrel 25 in the optical axis direction without rotating about the optical axis O. After the external barrel 25 has been coupled to the second cam barrel 18 in such a manner, rotating the second cam barrel 18 in forward and reverse directions about the optical axis within the operating section U causes the external barrel 25 to move forward and rearward in the optical axis direction in accordance with the contours of the guide grooves 18b. Therefore, in the zooming section Z, rotation of the first cam barrel 17 causes the focal length of the photographic optical system to vary while rotation of the second cam barrel 18, which rotates about the optical axis O together with the first cam barrel 17, causes the external barrel 25 to move forward and rearward in the optical axis direction to change the space between the frontmost lens group (the first lens group L1) and the barrier block 27 in the optical axis direction to thereby prevent unwanted light from being incident on the frontmost lens surface of the zoom lens. In a state where each of the radially inward pins 25b of the external barrel 25 is positioned in the operating section U of the corresponding guide groove 18b, the external barrel 25 cannot be dismounted from the second cam barrel 18 by moving the external barrel 25 forward from the second cam barrel 18.

Figure 19:
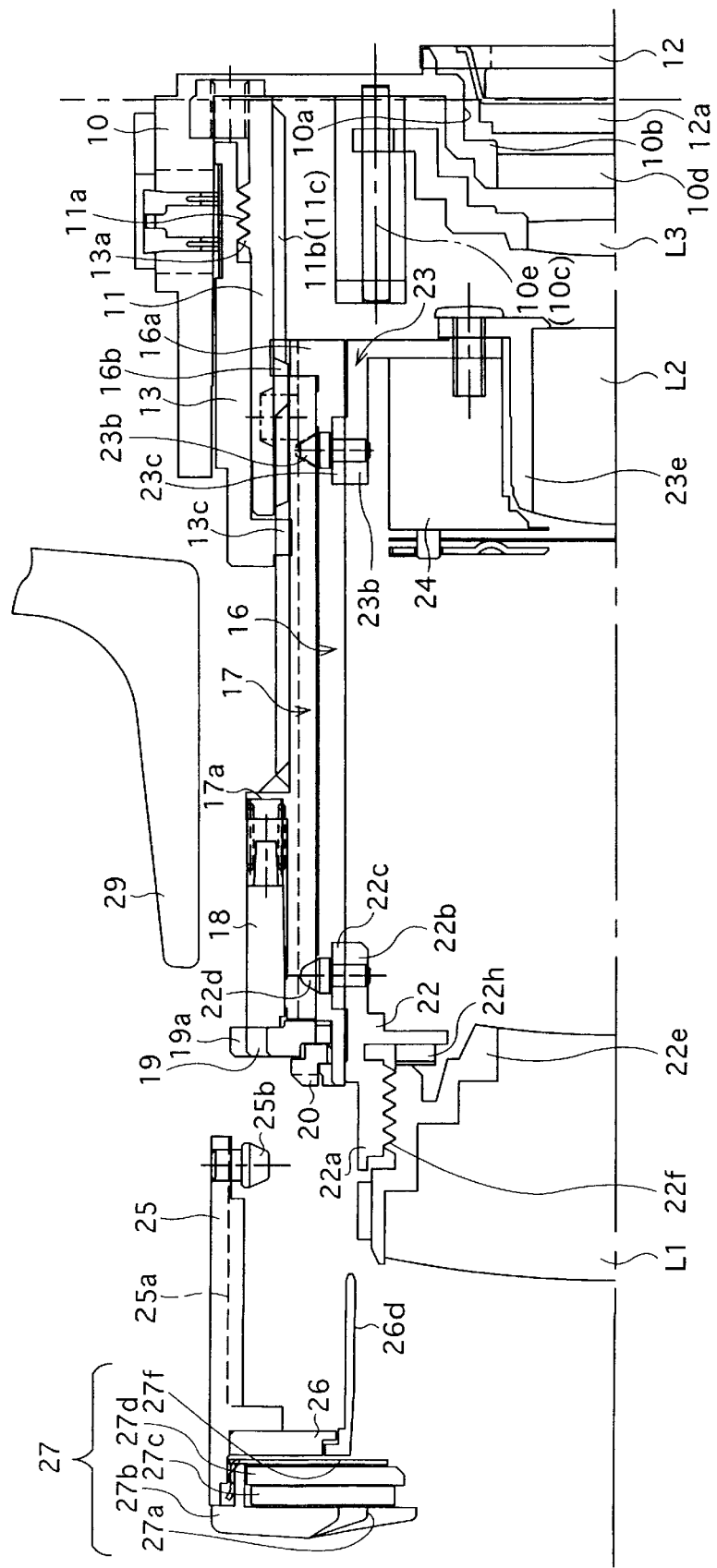
FIG. 19 is an axial cross sectional view of the zoom lens shown in FIG. 1, showing the zoom lens above the optical axis thereof, and showing a state where the external barrel together with the barrier block is dismounted from the zoom lens.

It is possible to control whether the second cam barrel 18 is driven using mechanical stops or electrically driven to rotate to the assembling position X via the assembling section AS or within the operating section U. In either controlling manner, when the first cam barrel 17 is driven to rotate between the accommodation position thereof and the wide-angle position thereof, each radially inward pin 25b slides within the operating section U of the associated guide groove 18b of the second cam barrel 18, which rotates together with the first cam barrel 17, so that each radially inward pin 25b does not enter the assembling section AS of the associated guide groove 18b. If the first cam barrel 17 is moved to the position shown in FIG. 21B slightly in front of the wide-angle position of the first cam barrel 17, each radially inward pin 25b slides into the assembling section AS of the associated guide groove 18b to be positioned at the assembling position X, which allows the external barrel 25 together with the barrier block 27 to be dismounted from the front of the zoom lens by moving the external barrel 25 forward from the assembly composed of the first cam barrel 17 and the linear guide barrel 16, as shown in FIG. 19.

As described above, when the first cam barrel 17 has been moved to the position shown in FIG. 21B, each linear guide projection 16b of the linear guide barrel 16 is positioned at the border between the corresponding linear guide groove 11c and the corresponding introducing groove lid and at the same time each the inward projection 13c of the rotational barrel 13 is positioned at the border between the corresponding rotation transmission groove 17c and the corresponding introducing groove 17d. Further rotation of the first cam barrel 17 to move the first cam barrel 17 forward allows the assembly composed of the first cam barrel 17 and the linear guide barrel 16 to be dismounted from the stationary barrel 11 and the rotational barrel 13 by moving the assembly composed of the first cam barrel 17 and the linear guide barrel 16 forward from the stationary barrel 11. During this stage of dismounting the assembly composed of the first cam barrel 17 and the linear guide barrel 16, the first cam barrel 17 and the linear guide barrel 16 do not rotate relative to each other, and at the same time, the rotational barrel 13 does not interfere with the rotation of the first cam barrel 17. Accordingly, the present embodiment of the zoom lens excels in the efficiency of assembly and disassembly of the lens groups.

Once the zoom lens is disassembled in a manner as shown in FIG. 20, the second lens frame 23 can be taken out of the assembly composed of the first cam barrel 17 and the linear guide barrel 16 from the rear thereof without changing the relative rotational position between the first cam barrel 17 and the linear guide barrel 16. Subsequently, the first lens frame 22 can be taken out of the assembly composed of the first cam barrel 17 and the linear guide barrel 16 from the rear thereof if the first cam barrel 17 and the linear guide barrel 16 are rotated relative to each other so that each follower pin 22d moves to the rear end opening of the associated first cam groove 17C1.

Accordingly, in the present embodiment of the zoom lens, if the first cam barrel 17 is moved to the position shown in FIG. 21B slightly in front of the wide-angle position of the first cam barrel 17, firstly the external barrel 25 together with the barrier block 27 can be dismounted from the front of the zoom lens, secondly an assembly which includes the first cam barrel 17, the second cam barrel 18, the linear guide barrel 16, the first lens group L1, the second lens group L2 and other members can be dismounted from the stationary barrel 11, and thirdly the second lens frame 23 that holds the second lens group L2 can be taken out of the assembly. After the second lens frame 23 is taken out of the assembly, the first lens frame 22 can be taken out of the assembly by changing the relative rotational position between the first cam barrel 17 and the linear guide barrel 16. Accordingly, the present embodiment of the zoom lens can be easily assembled and disassembled, and maintenance of the zoom lens is facilitated.

The present invention is not limited solely to the above illustrated embodiment. For instance, in the illustrated embodiment, in order to transmit rotation of the rotational barrel 13 to the first cam barrel 17, the three rotation transmission grooves 17c are formed on the first cam barrel 17 at an equi-angular distance (120° intervals in the illustrated embodiment) about the axis of the first cam barrel 17, while the three inward projections 13c of the rotational barrel 13, which are respectively slidably engaged in the three rotation transmission grooves 17c of the first cam barrel 17, are formed on an inner peripheral surface of the rotational barrel 13. In a conventional zoom lens, for instance, a circumferential gear which is in mesh with a drive pinion (not shown) is formed on a cam barrel which corresponds to the first cam barrel 17 to rotate the cam barrel by rotation of the drive pinion. However, according to this conventional structure, there is a possibility of the cam barrel being slightly deformed since the drive pinion meshes with the circumferential gear of the cam barrel at a position away from the rotational axis of the cam barrel. Although the above illustrated embodiment of the zoom lens according to the present invention is superior to a zoom lens having such conventional structure in that there is no possibility of the cam barrel (the first cam barrel 17) being deformed due to such conventional structure, the above described zoom lens assembling mechanism according to the present invention can also be applied to a zoom lens wherein a drive pinion is in mesh with a circumferential gear formed on a cam barrel which corresponds to the first cam barrel 17 of the above illustrated embodiment. In other words, if only the above illustrated embodiment of the zoom lens is structured so that at least a certain amount of engagement between the male and female helicoids 17b and 11b in the optical axis direction is ensured even when the first cam barrel 17 is in the maximum extended position thereof in the operating range as shown in FIG. 21A and so that the linear guide barrel 16 rotates together with the first cam barrel 17 when the first cam barrel 17 is moved forward from the maximum extended position thereof, the optical performance of the zoom lens can be maintained while an excellent ability for the zoom lens to be assembled and disassembled can be ensured.

Moreover, although, in the illustrated embodiment, the movable barrel (cam barrel) positioned between the stationary barrel 11 and the linear guide barrel 16 in the radial direction includes two barrels (i.e., the first cam barrel 17 and the second cam barrel 18), an integrally formed barrel can be alternatively applied to the movable barrel of the present invention.

As can be understood from the above description, according the present invention, a zoom lens assembling mechanism with which the optical performance of the zoom lens can be maintained, which prevents unwanted light from entering into the zoom lens from a gap between two barrels of the zoom lens, and which makes it easy for the zoom lens to be assembled and disassembled, can be obtained.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A zoom lens assembling mechanism comprising:

a stationary barrel having a female helicoid formed on an inner peripheral surface of said stationary barrel;

a linear guide groove formed on said inner peripheral surface of said stationary barrel to cut across said female helicoid to extend parallel to an optical axis of said zoom lens;

an inner inclined groove formed on said inner peripheral surface of said stationary barrel in front of said linear guide groove in an optical axis direction so that a major part of said inner inclined groove extends parallel to the threads of said female helicoid, so that one end of said inner inclined groove opens at a front end of said stationary barrel, and so that the other end of said inner inclined groove is connected with said linear guide groove;

a movable barrel having a male helicoid formed on an outer peripheral surface of said movable barrel to mesh with said female helicoid, said movable barrel being moved forward and rearward in said optical axis direction while rotating about said optical axis in accordance with an engagement of said male helicoid with said female helicoid;

a linear guide barrel guided to be movable together with said movable barrel in said optical axis direction and to be rotatable relative to said movable barrel about said optical axis;

a linear guide projection formed on said linear guide barrel to be engaged in said linear guide groove, so that said linear guide projection can also be engaged in said inner inclined groove; and at least one lens group guided in said optical axis direction without rotating about said optical axis by said linear guide barrel to be moved in said optical axis direction in a predetermined moving manner in accordance with rotation of said movable barrel to change a focal length of said zoom lens;

wherein said linear guide barrel is guided in said optical axis direction with said linear guide projection being engaged in said linear guide groove when said movable barrel is positioned in an operating range, including a zooming range of said movable barrel, relative to said stationary barrel;

wherein said male helicoid and said female helicoid are engaged with each other by an amount of engagement in said optical axis direction which corresponds to a width in said optical axis direction of an area on said inner peripheral surface of said stationary barrel in which said inner inclined groove is formed when said movable barrel is positioned in a frontmost position thereof in said operating range; and wherein, in the case where said movable barrel is moved forward from said frontmost position relative to said stationary barrel in order to disassemble an assembly including said movable barrel and said linear guide barrel from said stationary barrel, said linear guide barrel moves forward in said optical axis direction, and at the same time, rotates together with said movable barrel about said optical axis while said linear guide projection slides along said inner inclined groove to thereby disassemble said assembly from said stationary barrel.

2. The zoom lens assembling mechanism according to claim 1, further comprising:

a rotational barrel positioned around said movable barrel, said rotational barrel being rotationally driven;

a rotation transmission groove formed on said outer peripheral surface of said movable barrel to cut across said male helicoid to extend parallel to said optical axis;

an outer inclined groove formed on said outer peripheral surface of said movable barrel behind said rotation transmission groove in said optical axis direction so that a major part of said outer inclined groove extends parallel to the threads of said male helicoid, so that one end of said outer inclined groove opens at a rear end of said movable barrel, and so that the other end of said outer inclined groove is connected with said rotation transmission groove; and an inward projection formed on said rotational barrel to be engaged in said rotation transmission groove, so that said inward projection can also be engaged in said outer inclined groove;

wherein rotation of said rotational barrel is transmitted to said movable barrel with said inward projection being engaged in said rotation transmission groove when said movable barrel is positioned in said operating range relative to said stationary barrel; and wherein, in the case where said movable barrel is moved forward from said frontmost position relative to said stationary barrel in order to disassemble said assembly from said stationary barrel, said linear guide barrel moves forward in said optical axis direction, and at the same time, rotates together with said movable barrel about said optical axis while said inward projection slides along said outer inclined groove to thereby disassemble said assembly from said stationary barrel.

3. The zoom lens assembling mechanism according to claim 1, further comprising:

a cam groove formed on an inner peripheral surface of said movable barrel so that a rear end of said cam groove opens at a rear end of said movable barrel;

a linear guide slot formed on said linear guide barrel to extend parallel to said optical axis so that a rear end of said linear guide slot opens at a rear end of said linear guide barrel;

a lens frame which holds said lens group;

a cam follower formed on said lens frame to be engaged in said cam groove; and a linear guide projection formed on said lens frame to be engaged in said linear guide slot;

wherein said cam follower and said linear guide projection are respectively engaged in said cam groove and said linear guide slot, at rear ends thereof, when said assembly is moved forward from said stationary barrel to disassemble said assembly from said stationary barrel.

4. The zoom lens assembling mechanism according to claim 3, wherein said cam follower is formed on said linear guide projection.

5. The zoom lens assembling mechanism according to claim 1, further comprising:

a hood barrel positioned at the front of said zoom lens around said movable barrel, guided in said optical axis direction without rotating about said optical axis;

an inward pin fixed to said hood barrel to project radially inwards; and a hood barrel guide groove formed on an outer peripheral surface of said movable barrel, said inward pin being engaged in said hood barrel guide groove so that said hood barrel moves in said optical axis direction via rotation of said movable barrel;

wherein said hood barrel guide groove comprises an assembling section and an operating section connected to said assembling section so as to extend substantially along a circumferential direction of said movable barrel;

wherein one end of said assembling section opens at the front end of said movable barrel;

wherein said operating section comprises a zooming section in which rotation of said movable barrel causes said hood barrel to move forward and rearward in said optical axis direction;

wherein said rotation of said movable barrel causes said hood barrel to move forward and rearward in said optical axis direction to change a distance between a frontmost lens group of said lens group and the front end of said hood barrel in said optical axis direction in accordance with a variation of said focal length;

wherein said hood barrel can be disassembled from said front of said zoom lens by moving said inward pin forward to pull out said inward pin from said hood barrel guide groove when said inward pin is positioned in said one end of said assembling section; and wherein said assembly can be dismounted from said stationary barrel by being moved slightly forward from said frontmost position of said movable barrel relative to said stationary barrel when said movable barrel is positioned to have a predetermined rotational position relative to said stationary barrel so as to allow said hood barrel to be disassembled from said front of said zoom lens.

6. The zoom lens assembling mechanism according to claim 5, further comprising a barrier block fixed to said front end of said hood barrel and having at least one barrier blade for opening and closing a photographic aperture of said zoom lens.

7. The zoom lens assembling mechanism according to claim 1, wherein said linear guide groove, said inner inclined groove, and said linear guide projection respectively comprise a plurality of linear guide grooves, a plurality of inner inclined grooves, and a plurality of linear guide projections.

8. The zoom lens assembling mechanism according to claim 2, wherein said rotational transmission groove, said outer inclined groove, and said inward projection respectively comprise a plurality of rotational transmission grooves, a plurality of outer inclined grooves, and a plurality of inward projections.

9. The zoom lens assembling mechanism according to claim 1, wherein said zoom lens is incorporated in a digital camera.

10. A zoom lens assembling mechanism comprising:

a stationary barrel;

a movable barrel extending from the inside of said stationary barrel, and driven to move forward and rearward in an optical axis direction while rotating about said optical axis;

a linear guide barrel guided to be movable together with said movable barrel in said optical axis direction and to be rotatable relative to said movable barrel about said optical axis;

a linear guide mechanism, provided on said linear guide barrel and said stationary barrel, for guiding said linear guide barrel in said optical axis direction without rotating said linear guide barrel about said optical axis; and at least one lens group guided in said optical axis direction without rotating about said optical axis by said linear guide barrel to be moved in said optical axis direction in a predetermined moving manner in accordance with rotation of said movable barrel to change a focal length of said zoom lens;

wherein, when said movable barrel is positioned in an operating range thereof including a zooming range of said movable barrel relative to said stationary barrel, said linear guide barrel is guided in said optical axis direction via said linear guide mechanism while said movable barrel moves together with said linear guide barrel in said optical axis direction while rotating about said optical axis relative to said linear guide barrel to move said at least one lens group in a predetermined moving manner; and wherein, in the case where said movable barrel is moved forward from a frontmost position of said operating range relative to said stationary barrel in order to disassemble an assembly including said movable barrel and said linear guide barrel from said stationary barrel, said linear guide barrel is no longer guided by said linear guide mechanism, and said linear guide barrel moves forward by a predetermined amount of movement in said optical axis direction while rotating together with said movable barrel about said optical axis to thereby disassemble said assembly from said stationary barrel.

11. The zoom lens assembling mechanism according to claim 10, further comprising:

a rotational barrel positioned around said movable barrel and driven to rotate; and a rotation transmission mechanism for transmitting rotation of said rotational barrel to said movable barrel, wherein said rotation of said rotational barrel is transmitted to said movable barrel via said rotation transmission mechanism when said movable barrel is positioned in said operating range relative to said stationary barrel; and wherein, in the case where said movable barrel is moved forward from said frontmost position relative to said stationary barrel in order to disassemble said assembly from said stationary barrel, said rotation transmission mechanism is made inoperable between said rotational barrel and said movable barrel to thereby allow said assembly to be disassembled from said stationary barrel without rotating said rotational barrel about said optical axis.

12. The zoom lens assembling mechanism according to claim 10, wherein said stationary barrel comprises a female helicoid formed on an inner peripheral surface of said stationary barrel;

wherein said movable barrel comprises a male helicoid formed on an outer peripheral surface of said movable barrel to mesh with said female helicoid, said movable barrel being moved forward and rearward in said optical axis direction while rotating about said optical axis in accordance with an engagement of said male helicoid with said female helicoid.

13. The zoom lens assembling mechanism according to claim 10, further comprising:

a cam groove formed on an inner peripheral surface of said movable barrel so that a rear end of said cam groove opens at a rear end of said movable barrel;

a linear guide slot formed on said linear guide barrel to extend parallel to said optical axis so that a rear end of said linear guide slot opens at a rear end of said linear guide barrel;

a lens frame which holds said lens group;

a cam follower formed on said lens frame thereon to be engaged in said cam groove; and a linear guide projection formed on said lens frame to be engaged in said linear guide slot;

wherein said cam follower and said linear guide projection are respectively engaged in said cam groove and said linear guide slot, at rear ends, thereof when said assembly is moved forward from said stationary barrel to disassemble said assembly from said stationary barrel.

14. The zoom lens assembling mechanism according to claim 13, wherein said cam follower is formed on said linear guide projection.

15. The zoom lens assembling mechanism according to claim 10, further comprising:

a hood barrel positioned at the front of said zoom lens around said movable barrel, guided in said optical axis direction without rotating about said optical axis;

an inward pin fixed to said hood barrel to project radially inwards; and a hood barrel guide groove formed on an outer peripheral surface of said movable barrel, said inward pin being engaged in said hood barrel guide groove so that said hood barrel moves in said optical axis direction via rotation of said movable barrel;

wherein said hood barrel guide groove comprises an assembling section and an operating section connected to said assembling section so as to extend substantially along a circumferential direction of said movable barrel;

wherein one end of said assembling section opens at the front end of said movable barrel;

wherein said operating section comprises a zooming section in which rotation of said movable barrel causes said hood barrel to move forward and rearward in said optical axis direction;

wherein said rotation of said movable barrel causes said hood barrel to move forward and rearward in said optical axis direction to change a distance between a frontmost lens group of said lens groups and the front end of said hood barrel in said optical axis direction in accordance with a variation of said focal length;

wherein said hood barrel can be disassembled from said front of said zoom lens by moving said inward pin forward to pull out said inward pin from said hood barrel guide groove when said inward pin is positioned in said one end of said assembling section; and wherein said assembly can be dismounted from said stationary barrel by being moved slightly forward from said frontmost position of said movable barrel relative to said stationary barrel when said movable barrel is positioned to have a predetermined rotational position relative to said stationary barrel so as to allow said hood barrel to be disassembled from said front of said zoom lens.

16. The zoom lens assembling mechanism according to claim 15, further comprising a barrier block fixed to said front end of said hood barrel and having at least one barrier blade for opening and closing a photographic aperture of said zoom lens.

17. The zoom lens assembling mechanism according to claim 10, wherein said linear guide mechanism comprises:

a linear guide groove formed on an inner peripheral surface of said stationary barrel to extend parallel to an optical axis of said zoom lens; and a linear guide projection formed on said linear guide barrel to be engaged in said linear guide groove of said stationary barrel, wherein said stationary barrel further comprises an inner inclined groove formed on said inner peripheral surface thereof in front of said linear guide groove in an optical axis direction so that a major part of said inner inclined groove is inclined with respect to said linear guide groove, so that one end of said inner inclined groove opens at a front end of said stationary barrel, and so that the other end of said inner inclined groove is connected with said linear guide groove, wherein, when said movable barrel is positioned in said operating range thereof, said linear guide projection is engaged in said linear guide groove, and wherein, in the case where said movable barrel is moved forward from said frontmost position of said operating range relative to said stationary barrel, said inner guide projection is inserted in said inner inclined groove, so that said linear guide barrel moves forward in said optical axis direction while rotating together with said movable barrel.

18. The zoom lens assembling mechanism according to claim 17, wherein said stationary barrel comprises a female helicoid formed on said inner peripheral surface thereof, the threads of said female helicoid extending parallel to said inner inclined groove, wherein said movable barrel comprises a male helicoid formed on an outer peripheral surface thereof to mesh with said female helicoid, and wherein, said movable barrel is moved forward and rearward in said optical axis direction while rotating with respect to said stationary barrel, in accordance with an engagement of said male helicoid with said female helicoid.

19. The zoom lens assembling mechanism according to claim 18, wherein said male helicoid and said female helicoid are engaged with each other when said linear guide projection is inserted in one of said linear guide groove and said inner inclined groove.

20. The zoom lens assembling mechanism according to claim 10, wherein said zoom lens is incorporated in a digital camera.

* * * * *